(12) United States Patent
Nuell

(10) Patent No.: US 10,807,007 B2
(45) Date of Patent: Oct. 20, 2020

(54) MULTIPLAYER PARTISAN SUDOKU (SUDOKU CHESS)

(71) Applicant: Michael John Nuell, Potomac, MD (US)

(72) Inventor: Michael John Nuell, Potomac, MD (US)

(*) Notice: Subject to any disclaimer, the term of this patent is extended or adjusted under 35 U.S.C. 154(b) by 0 days.

(21) Appl. No.: 15/273,708

(22) Filed: Sep. 23, 2016

(65) Prior Publication Data

US 2017/0197150 A1    Jul. 13, 2017

Related U.S. Application Data

(60) Provisional application No. 62/222,517, filed on Sep. 23, 2015.

(51) Int. Cl.

| | |
|---|---|
| *A63F 13/822* | (2014.01) |
| *A63F 13/32* | (2014.01) |
| *A63F 13/33* | (2014.01) |
| *A63F 13/335* | (2014.01) |
| *A63F 13/34* | (2014.01) |
| *A63F 13/46* | (2014.01) |
| *A63F 3/04* | (2006.01) |

(52) U.S. Cl.
CPC ............ *A63F 13/822* (2014.09); *A63F 13/32* (2014.09); *A63F 13/33* (2014.09); *A63F 13/335* (2014.09); *A63F 13/34* (2014.09); *A63F 13/46* (2014.09); *A63F 2003/0418* (2013.01)

(58) Field of Classification Search
CPC .............................. A63F 13/46; A63F 13/822
See application file for complete search history.

(56) References Cited

U.S. PATENT DOCUMENTS

| | | | | |
|---|---|---|---|---|
| 7,677,570 | B2 * | 3/2010 | Hohenstein | A63F 3/02 273/153 R |
| 9,302,175 | B2 * | 4/2016 | Arnone | G07F 17/3223 |
| 9,600,960 | B2 * | 3/2017 | Arnone | G07F 17/3223 |
| 2007/0129127 | A1 * | 6/2007 | Huang | A63F 3/0415 463/9 |
| 2010/0171266 | A1 * | 7/2010 | Hohenstein | A63F 3/02 273/271 |
| 2012/0289324 | A1 * | 11/2012 | Bancel | A63F 3/00157 463/26 |
| 2013/0079082 | A1 * | 3/2013 | Bancel | A63F 3/0415 463/9 |

(Continued)

FOREIGN PATENT DOCUMENTS

GB    2430893 A  *  4/2007

*Primary Examiner* — Omkar A Deodhar
(74) *Attorney, Agent, or Firm* — Boswell IP Law; J. Mason Boswell

(57) ABSTRACT

A multiplayer partisan Sudoku system provides a non-chance, turn-based, territory-control strategy game and method of play in which multiple players compete in a "head-to-head" environment in order to control the greatest number of regions on a special case of Latin squares that are subdivided and have an additional regional constraint, commonly understood as a "Sudoku" square. In one embodiment, players compete to gain control of regions by placing integers 0 to n−1 into the boxes within the regions. Thus, the multiplayer partisan Sudoku system provides exciting multiplayer game play based on familiar Sudoku rules.

20 Claims, 12 Drawing Sheets

(56) References Cited

U.S. PATENT DOCUMENTS

2015/0080074 A1* 3/2015 Arnone ............... G07F 17/3223
 463/9
2016/0171823 A1* 6/2016 Arnone ............... G07F 17/3223
 463/10
2017/0193752 A1* 7/2017 Arnone ............... G07F 17/3262

* cited by examiner

MULTIPLAYER PARTISAN SUDOKU (SUDOKU CHESS)

CROSS-REFERENCE TO RELATED APPLICATIONS

The present application claims the benefit of U.S. Provisional Patent Application No. 62/222,517 entitled "Sudoku Chess (M)," and filed on 2015 Sep. 23, which is hereby incorporated by reference.

BACKGROUND

Sudoku is a logic-based, combinatorial, number-placement puzzle that centers on the concept of a special case of a Latin square. A Latin square is defined as an n-by-n array containing n integers/symbols with each integer or symbol occurring exactly once in each row and column. The standard Sudoku format further divides the array into n regions, with the additional constraint that each integer/symbol may occur only once in a given region. The Sudoku puzzle is a partially filled-in Sudoku grid that requires the player to fill the remaining boxes, typically in a nine-by-nine array, where the completed puzzle conforms to the rules of the Sudoku-style Latin square. While Sudoku remains a challenging and popular hobby, the puzzle is largely considered a single player endeavor, with multiplayer game play for the most part restricted to players competing in a timed environment in order to complete a Sudoku puzzle in the shortest amount of time.

However, the added time pressure of this variant removes the meditative aspect of puzzle solving that is one of the main appeals of such pastimes, namely puzzles, and Sudoku in particular. Other exotic multiplayer Sudoku game variants are based on being the last player to place an integer, or blocking the opposing player from playing all of their integers, or filling the greatest number of cells, or placing the greatest value in integers. All of these variations are what is termed "impartial", in the sense that both player's have access to the same moves (i.e. placements) and none has achieved any meaningful adoption by players. However, there is perennial demand for multiplayer, partisan, turn-based, territory-control strategy games as evidenced by the widespread adoption of modern variants such as Monopoly and Risk. More recently, games such as the "Sid Meier's Civilization" franchise have achieved wide adoption in the electronic medium.

Of these types of games, the most widely adopted by far may be deemed abstract, in the sense of being comprised of a small set of fundamental components, a simple set of basic rules, a game board comprised of a basic, geometrical context such as a grid, perfect information, and a lack of random elements such as dice, spinner, or drawn cards. The limited number of components and rules, and the simplicity of the game board make such games easy to embody, which contributes to their wide adoption. Perfect information and lack of random elements make such games contests of pure skill and contribute to their prestige, with mastery of such games often associated with genius. Chess and Go are examples of such fundamental games, with Chess reported to have in excess of 600 million regular players (nearly 1/10 of the current world population). The polling organization YouGov has reported that 70% of the adult population has played Chess at some point in their lives. Although the objective of Chess is to capture the opponent's king, the functional mechanism to achieve this objective includes controlling the territory of the game-grid, and thus it can be understood as a territory-control game.

Go and Chess can alternately be defined as "partisan, zero-sum, perfect-information, deterministic strategy games" which are combinatorial in nature. The term combinatorial in a player versus player game context here refers to a class of deterministic, sequential games with perfect information. Perfect information refers to the visibility of all moves and changes to all players, so that when making a decision, the player is fully informed as to the results of all previous moves and changes. Combinatorial Game Theory ("CGT") is defined as a branch of applied mathematics and theoretical computer science that studies such games, which may be further defined as "games which have a position in which the players take turns changing in defined ways or moves to achieve defined winning conditions." Combinatorial games have been studied exhaustively in the fields of math and computer science. Although CGT has largely been restricted to the study of two-player games, there is no requirement for this limitation. Indeed, the definition of what constitutes a combinatorial game seems to be ever expanding, and based on the ability to mathematically analyze the game in question. Chinese Checkers is an example of 2+ player variant, with the game allowing 2, 4, and 6 players respectively.

Sudoku is an example of a one player combinatorial puzzle. "Puzzle" because games technically require more than one player in a competitive context. There is also a class of combinatorial "no player automata" such as Conway's Game of Life. There is no absolute definition of combinatorial game; scholars and enthusiasts define them in varying ways based on their studies and preferences. Certain conditions such as win/lose (meaning no draws or stalemates) are often proposed, but there is no actual requirement for this, and the most widely known games defined as combinatorial, specifically Chess and Tic-Tac-Toe, allow draws. Some would include games with chance elements (Poker, Backgammon) and imperfect information (Stratego, Battleship) to be defined as combinatorial because of the capability of contemporary mathematics to analyze such games.

Although modern, pre-electronic, multiplayer, turn-based, strategy board games (such as Monopoly and Risk) have not made the transition to the electronic medium in any remarkable way, fundamental multiplayer, turn-based strategy board games, and combinatorial games in general, have been widely adopted in the electronic medium. The first reported computer game "Nimatron" (1939) was a version of the fundamental combinatorial game Nim. Prior to this Charles Babbage (1791-1871) proposed a mechanical computer version of Tic-Tac-Toe, another classic combinatorial game that may be one of the oldest and most widely played games in existence. Chess in particular has existed on nearly all classes of computing devices beginning with at least the mainframe, and including but not limited to the stationary personal computer and mobile computers such as smartphones and tablets, often in numerous, separate offerings. In recent years, Chess apps have been downloaded on Google Play at least 50 million times and potentially in excess of 220 million times. A similar number can be assumed for Apple's App Store.

Such fundamental two player strategy games are among the oldest games known, with the game Senet dating back to before 3000 BCE. The Royal Game of Ur, for which the rules have been preserved on clay tablets, and for which the earliest evidence dates back to about 2500 BCE, has been credibly reported as still being played in Iraq today.

Sudoku, a similarly fundamental puzzle in the sense of having a limited number of components and rules, and a simple, geometrical game board, has achieved worldwide popularity, appears daily in hundreds of newspapers, with books of the puzzle commonly available in bookstores and newsstands. Sudoku has also made the transition to the electronic medium extremely well as evidenced by the wide availability of Sudoku apps and variants on modern computing devices. In recent years, Sudoku apps have been downloaded on Google Play at least 40 million times, and potentially in excess of 170 million times, with similar numbers assumed for Apple's App Store. Sudoku has further introduced a wide game playing public to the concept of the Latin square, and specifically the rule-set of the Sudoku-style Latin square. Indeed, the number of people who know the rules of Sudoku may far exceed the number of regular Sudoku players.

Sudoku, Chess, and Go are alike in generation of seemingly infinite variation from a limited number of elements. From a gameplay perspective, this elegant generation of extreme complexity constitutes effectively unlimited "replay-ability." Sudoku, on a nine-by-nine grid, has in excess of $6.6*10^{21}$ possible combinations. When symmetries are taken into account this number may be reduced to about 5.5 billion, however from a game play standpoint, such symmetries would be difficult for the human mind to easily recognize. For this reason especially, the Sudoku grid makes an exceptionally compelling context for a player vs. player strategy game, as evidenced by the numerous attempts to devise such games. Sudoku and Chess have a further similarity in that they use elements of different values and/or qualities as game piece components, unlike Go, in which all game pieces have the same quality.

DETAILED DESCRIPTION

Figure 1:
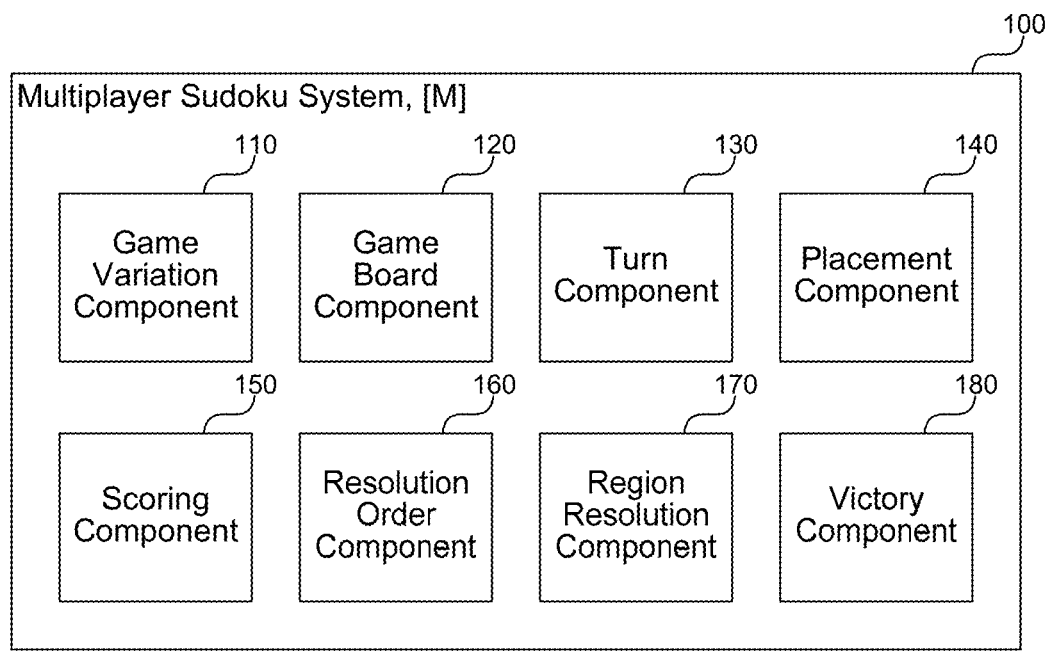
FIG. 1 is a block diagram that illustrates components of the multiplayer partisan Sudoku system, in one embodiment.

A multiplayer partisan Sudoku system is described herein that seeks to address the aforementioned issues with previous attempts at multiplayer Sudoku, as well as provide users with a set of novel, fundamental, multiplayer, turn-based, territory-control, strategy board games similar to Chess and Go, and a method of play for a set of non-trivial, sequential, perfect-information, deterministic strategy games based on the Sudoku-style Latin square where gameboard size and number of players is theoretically unlimited. The multiplayer partisan Sudoku system (hereafter "[M]") provides a set of computer-implemented, grid-based, multiplayer games based on the fundamentals of a subdivided Latin square with an additional regional exclusivity constraint, commonly understood as a Sudoku grid. Some embodiments rely on computer implementation, as, unlike pre-computing games of this type, the [M] method described herein benefits from a gameboard with processing capability to facilitate play by assuming the function of on-going score keeping, among other advantages. More specifically, the present disclosure is a set of multiplayer, partisan, turn-based, territory-control strategy games ("Sudoku Chess") and method of play in which players attempt to control the greatest number of regions at the end of the game by placing integers which have values onto a Sudoku-style game board. In more formal CGT terms, this method is for a class of games generally known as non-trivial, sequential, perfect-information, deterministic, games, which when embodied in a strictly competitive manner, can further be defined as partisan and zero-sum. Further, the method and games derived from it fall into the category sometimes referred to as "games of pure skill," which also includes games such as Chess, Checkers, Go and Tic-Tac-Toe.

The [M] system provides a set of non-chance, turn-based, territory-control strategy games and method of play in which multiple players compete in a "head-to-head" environment in order to control the greatest number of regions on a special case of Latin squares that are subdivided and have an additional regional constraint, commonly understood as a "Sudoku" square. One embodiment of this strategy game is a contest between two players, and the contest is undertaken on a computer-implemented game board comprised of a single n-by-n grid that is divided into n regions. Placement of integers must be "legal" in the sense that they must conform to the rules of the Sudoku-style Latin square (e.g., there may be no more than a single instance of any given integer in a row, column, or region). Players compete to gain control of regions by placing integers 0 to n−1 into the boxes within the regions. Thus, the [M] system provides exciting multiplayer game play based on familiar Sudoku rules, with a further innovation in that, unlike the Sudoku puzzle, utilization of the [M] system generally results in incompletable Sudoku grids due to player placement choices (i.e. it is possible to follow the Sudoku constraints in placement in the early game, without regard to whether discrete, legal placements will result in a later conflict rendering a given cell "dead" in the sense that no integers may be placed in that cell.

The allowance of these incompletable grids vastly increases the number of possible choices and outcomes.

Hereafter, the term "game" is used interchangeably with "games".

The game comprises a placement phase and a resolution phase. During the placement phase, players are permitted to put integers into boxes or cells on the game board grid. Players receive points in the region in which the integer has been placed corresponding to the value of the placed integer, with these points known as "native points" or "power." If a player places an integer into a box that borders another region or regions, that player receives a bonus of a percentage of the placed integer's value. In one embodiment, this constitutes an additional 50% of the point value of the placed integer in the bordering region(s). The bonus points awarded in non-native regions due to an integer on the border are referred to as "bordering points" or "influence." The placement phase continues with each player placing integers onto the grid in turn until no integers may be legally placed, or until all players mutually agree to begin the resolution phase of the game.

The resolution phase of the game refers to the resolution of regions that become "contested" during the placement phase of the game. Regions become contested when multiple players have points, either native or bordering, in the same sub grid. Conversely, a region in which only a single player has native or bordering points is considered "controlled." The player with the greatest number of accumulated points in a region is considered "dominant" in that region. Total accumulated points in a region for any given player are the sum of the native and bordering points. In one embodiment, when a contested region is "resolved," it is awarded to the dominant player. Regional resolution begins with the contested region with the highest disparity (or delta) in points between contesting players. When a region is awarded to the dominant player, all integers in that region are converted to the dominant player's, and point totals are adjusted accordingly. Bordering points granted in neighboring regions by bordering integers are also adjusted accordingly and awarded to the controlling player. Thus, winning a region through resolution can change the balance of power (i.e., the dominant player) in neighboring regions. Contested regions with equal deltas can be resolved simultaneously. Contested regions where no player is dominant, specifically contested regions with zero deltas, are unresolved. This condition of an unresolved or "stalemated" region can result in a tied game.

Once all regions that can be awarded have been awarded, the player who controls the greatest number of regions on the game board is the winner. If the number of regions controlled by players at the end of resolution is equal, the game may be declared a tie.

The game comprises a diverse set of rules including variations in resolution, scoring, integer placement, game board size, game objectives, duration, and victory conditions. These game rules may be selectively agreed upon and implemented by the players prior to the beginning of play. As such, the game is available in a number of different embodiments based on the rules that may be implemented from game to game. Additionally, while the core of the game revolves around the placement of integers into the appropriate boxes of a Sudoku-style Latin square, in alternative embodiments, the strategy game may be played utilizing symbols as well as other suitable "game pieces" that have assigned values.

The [M] system offers a set of turn-based, territory-control strategy games and method of play in which multiple players compete in order to control the greatest number of "regions" or regions on a Sudoku-style Latin square game board. In combinatorial game theory terms, the game may be defined as a sequential, deterministic, perfect information, strategy game. When embodied in a competitive manner, the strategy game may further be termed as partisan and zero-sum. When embodied on a game board grid greater than four-by-four, it may further be defined as non-trivial. The game can further be defined as "a game of pure skill."

Some embodiments of the strategy game are played on a computer-implemented game board formed by a single n-by-n grid that is divided into n regions. The n-by-n grid is typically nine-by-nine, but may be reduced to 4×4, or increased to 16×16, 25×25, or larger. It is appreciated that the game board may be of any size and is not limited to some embodiments, but only to the rules of the Sudoku-style Latin square where an added, regional placement constraint exists (specifically, that an integer may exist only once in a given region). In general, the square root of n must be a whole number so that the n-by-n grid may be divided into n regions, thus the game board is typically 4×4, 9×9, 16×16, etc. with no limitation other than those previously detailed. However, other configurations may be utilized. During the course of play, players compete to gain control over the regions by placing integers into the boxes (or cells) of the regions comprising the game-grid. Integers that may be placed into the grid include 0 to n−1 in one embodiment, and in some variants, 1 to n or other values. Many rule variations are permitted based on player agreement.

System Components

FIG. 1 is a block diagram that illustrates components of the [M] system, in one embodiment. The system 100 includes a game variation component 110, a game board component 120, a turn component 130, a placement component 140, a scoring component 150, a resolution order component 160, a region resolution component 170, and a victory component 180. Each of these components is described in further detail herein.

The game variation component 110 provides one or more options for game variations to the players and receives one or more values for each option. Game variations may affect what moves/placements are considered legal, how scoring is performed, what constitutes victory, the size of the game board, what types of pieces will be placed on the game board, how much time players have to make moves, and so forth. The component 110 may provide a default configuration that does not require players to select any options, but may also provide a more advanced user interface through which players can configure many different options. Other components of the system 100 read the selected game variation options to determine their behavior. For example, the placement component 140 may disallow placements that are determined illegal according to a particular game option and the scoring component 150 may compute scores differently based on the selected game options.

The game board component 120 provides a game board that is a Latin square adhering to the rules of Sudoku and that includes multiple regions (i.e. sub-grids) within a larger grid. The game board component 120 handles the size and appearance of the game board, and may include options for players to customize the appearance of the game, including selection of tiles or pieces, selection of background, selection of game board style, and so on. The game board component may also transmit and display the game board on different player devices, so that each player receives a rendering of the game board even if the players are not in the same physical location and are not using the same computing device. For example, the game board component 120 may transmit the game board via the World Wide Web to each player's web browser, to an app on each player's mobile device, to a traditional desktop application, to a game kiosk, to a television screen, or to any other device suitable for playing the game. Component 120 also allows for "peer to peer" function such as through Bluetooth, LAN, or other networking technology to share the game board between computing devices. The game board component 120 may also provide a rendering of the game board to non-players, such as spectators at a tournament.

The turn component 130 determines which of multiple players is allowed to make a placement at any given point in time during a game. For a two player game, the turn component manages whose turn it is among Player 1 and Player 2, and may prompt each player to make a placement during his/her turn or disallow a player from making a placement when it is not his/her turn. The turn component may also receive input from the players indicating a mutual agreement to end their turns and start the resolution process of the game. In some embodiments, the turn component may provide an option to allow a player to "pass" or skip his/her turn. Some game variations may include conditions under which a player can lose a turn, and in such instances, the turn component allows other players to have an additional turn.

The placement component 140 receives placements of values selected by players upon the game board. The placement component 140 determines the legality of each placement based on whose turn it is as well as the placement constraints of the game, and either allows or disallows a particular placement. For example, in traditional Sudoku, a particular symbol, typically an integer, is only allowed to occur once in a given column, row, and region, and the placement component 140 enforces these constraints. The placement component 140 may also interact with other components, such as the scoring component 150 to prompt that component to produce an updated score based on a received placement. The placement component 140 also interacts with the game variation component 110 to enforce any selected game variation options. When no further placements are possible or the players inform the system 100 that no further placements are desired, the placement component 140 can invoke the resolution order component 160 to start resolution.

The scoring component 150 tracks score information for each player and for each region. The scoring component 150 applies the game rules, primarily by assigning value to the integer symbols placed on the game grid. Value is applied primarily based on an integer's native region, and additionally if that integer borders another region, and potentially further modified by selected variation options, to determine a score for each region. This may include native points, influence points, and bonus points for special moves or achievements by each of the players. The scoring component may operate continuously during play of the game so that a score for each region can be displayed as game play progresses or may wait to operate at the end of game play when the resolution phase begins, or never be displayed. How scoring is calculated can be varied by configuration of the game by the players. For example, the amount of bonus awarded to influence points may be configurable.

The resolution order component 160 determines an order in which each region will be resolved to determine a final score and a dominant player for each region after a placement phase of the game has completed. The resolution order component 160 may communicate with the scoring component 150 to determine a current delta value for each region based on continuous scoring calculation provided by the scoring component 150. The delta indicates whether each region is contested, and which player is leading in each region as well as by what degree. The resolution order component 160 may order the regions by highest to lowest delta to perform resolution, or may use some other order based on game variation options that are configured by the players.

The region resolution component 170 resolves each region in an order specified by the resolution order component 160 to determine the final score and dominant player for each region. Resolution includes adding up the native points and influence points in a particular region as well as any bonus points, and determining which of the players to award the region. The resolution process determines a dominant player for each region, if possible, and may determine that no player is dominant or that there is a tie for a particular region. When the dominant player is awarded a region, all integers not belonging to the dominant player are granted to that player, and, where applicable, the new status of granted integers is passed to the scoring component 150. Game rules and selected variation options may determine how tie conditions are resolved.

The victory component 180 determines which among multiple players to declare a winner of the game based upon the determined dominant player for each region at the end of resolution. In some cases, the player that is dominant for the largest number of regions is declared the winner. However, game variation options may modify what is considered victory, so that other conditions lead to a particular player being designated the winner. For example, in some variations the player dominating the least number of regions may be selected as the winner. For game variations with multiple dimensions, some dimensions may be ranked more highly than others, and the victory component 180 applies these rankings to properly compute victory for one player. In some cases, ties or stalemates may be possible, in which case the component 180 declares a tie or stalemate and reports the result to the players. The victory component 180 may also store high scores or regions awarded across a series of games as well as other statistical information related to the game, such as for multiple rounds or tournament play.

The computing device on which the [M] system is implemented may include a central processing unit, memory, input devices (e.g., keyboard, pointing devices, and touch screens), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, Bluetooth, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, tablet computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

System Functions

Figure 2:
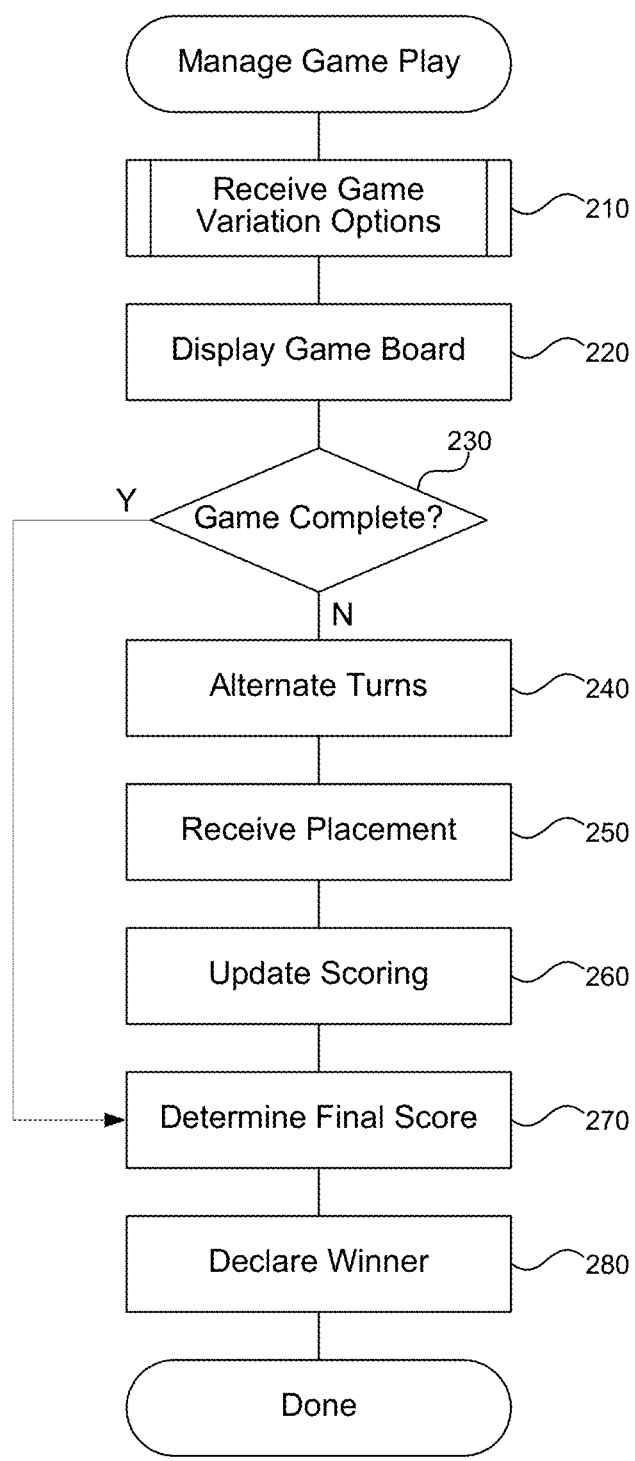
FIG. 2 is a flow diagram that illustrates processing of the multiplayer partisan Sudoku system to manage game play, in one embodiment.

FIG. 2 is a flow diagram that illustrates processing of the [M] system to manage game play, in one embodiment. Beginning in block 210, the system receives one or more game variation option values that determine how the game will be played. This process is described further with reference to FIG. 3, and may include changing the size of the game board, number of players, placement constraints, victory conditions, or any other optional aspects of game play offered by a particular implementation of the system.

Continuing in block 220, the system displays the game board on a computing device associated with each player, wherein the game board includes a grid with a plurality of regions arranged according to the rules of Sudoku. Displaying the game board may include transmitting the game information to a mobile device, web browser, game console, television, or other computing device associated with each player, as well as other non-players, such as spectators. The game board may be displayed using two-dimensional or three dimensional graphics, and may also have one or more decorative aspects, such as customized backgrounds, skins, or other elements. The game board may also include one or more un-played pieces associated with each of the players, as well as styling associated with each of the pieces. For example, one player may have one color pieces while another player has another color pieces. The pieces may be numbered or marked in some other way to signify their value and purpose.

Continuing in decision block 230, if the game is complete so that no further placements can be made, then the system jumps to block 270, else the system continues at block 240. A game may be complete either when there are no further legal placements or when the players mutually agree to end the game. In some embodiments, other conditions may also end a game, such as the expiration of an allotted time for the game.

Continuing in block 240, the system alternates which player's turn it is and allows the player whose turn it is to make a placement on the game board. Alternating turns may simply be a toggle between players, such as in the case of a two player game, or may be a round robin order between players, such as in a game with many players. In some game variations, whose turn it is may also factor in the possibility of "passing" so that a player forfeits his/her turn or losing a turn as a result of one or more events during the game.

Continuing in block 250, the system receives a placement from the player whose turn it is, which includes receiving an integer value and a location on the game board with which to associate the integer value. The system determines whether the placement is a legal move according to the game's rules and any variation options received. If the placement is not legal (e.g., if a particular row, column, or region where the value was placed already contains that value), then the system displays an error and may allow the player to try another placement. If the placement is legal then the system continues to block 260.

Continuing in block 260, the system updates scoring for each of the regions affected by the received placement. Scoring may include determining native points, such as the integer value added to a particular region, as well as influence points, such as some weighted factor of the integer value applied to regions other than the one in which the value was placed. The scoring may also include bonus points for other desirable game behavior, which may be configurable in the game options. Separate scores may be maintained for each player in each region, and/or the system may calculation a delta for each region and track which player is "up" in each region. In some two player games, one player's scores may be tracked as positive values while the other player's scores are tracked as negative values.

Continuing in block 270, after all of the placements are received the system determines a final score and dominant player for each region. The system may first determine an order in which each region will be resolved and determine a final score and dominant player for the regions in the determined order. Resolving a region may result in flipping the values of placements in that and other regions so that the scoring changes. In some cases, all of the placements and resulting score values in a region are resolved to one of the players, who is then deemed the dominant player for that region.

Continuing in block 280, the system declares a winner of the game based on which player dominates the most regions. In some cases, the conditions for victory are configurable in the game options. The player with the most regions may be declared the winner. In some instances, a tie may result in which case the system declares all players as winners or no players as winners. The system may report the winner and store the game result on a server or other central location so that others can view the results at a future time. This is helpful during contests and for maintaining player statistics and leaderboards. After block 280, these steps conclude.

Figure 3:
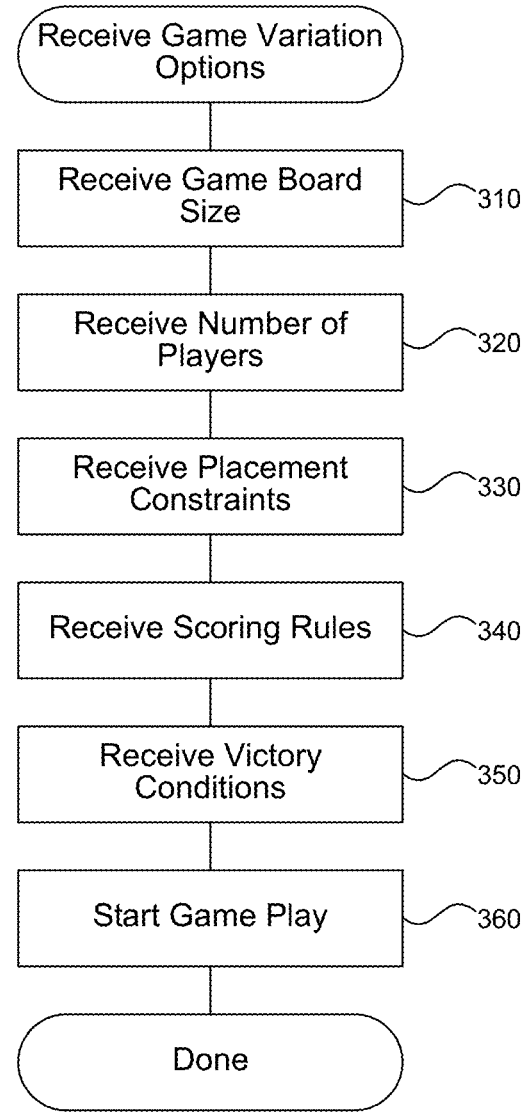
FIG. 3 is a flow diagram that illustrates processing of the multiplayer partisan Sudoku system to receive game play variation options, in one embodiment.

FIG. 3 is a flow diagram that illustrates processing of the [M] system to receive game play variation options, in one embodiment. Beginning in block 310, the system receives a game board size for a game board that includes a grid with multiple regions in which player pieces can be placed. In some embodiments, the system provides a default size that is used unless the players select a different size. The system may require a game board size with a square root that is a whole number (e.g., 4×4, 9×9, 16×16). However, other variations are possible, such as asymmetrical game boards, three-dimensional game boards such as cubes, and so forth. In some cases, the game board may have other qualities such as values for topography or trade that define various properties for different parts of the game board.

Application of value modifiers such as topography and resources, applied to Latin squares in general and not just Sudoku variants, is a novel aspect of the mapmaking method. These topography and resource modifiers may themselves have modifiers, such as related to the extremity of topography or quantity of resources. These tertiary modifiers are themselves values populated into Latin square or Sudoku maps. This process may continue ad infinitum. The map-making method has application beyond this set of games, i.e., it can be used for any games which require maps, such as strategy games or first-person shooters, which has separate value. In some cases the game board may have multiple map layers including, but not limited to, terrain, resources, structures, and so on.

Continuing in block 320, the system receives a number of players that is at least two. The system provides a multi-player experience but is not limited to only two players and may support higher player count modes. In some embodiments, the system may allow a human player to play against the computer, such that one of the players is provided by artificial intelligence ("AI"). AI vs. AI play is also allowed, where player may "plug-in" custom AIs. Players may also select pieces that will be associated with each player and other aspects of how the game will be played. In some embodiments, players may select icons in place of integers, but the system associates the integer values with each piece while displaying the icons.

Continuing in block 330, the system receives one or more placement constraints that define how players can place pieces within the regions of the game board. In some embodiments, each piece contains an associated integer value, and the placement constraints define that only one of each integer value can be placed in each row, column, and region. Other placement constraints may also be defined based on various game play options.

Continuing in block 340, the system receives one or more scoring rules for generating a score for each player for each region. The scoring rules can be based on native points, influence points, bonus points, and other types of factors described herein. A player has a score for each region based on each of these types of points. The players' relative scores in each region provide a delta that determines which player currently leads in a particular region. Players may use this information to strategize and decide where to make subsequent placements to achieve dominance or block dominance of other players in a particular region of the game board.

Continuing in block 350, the system receives one or more victory conditions that determine how a winner is declared among the players at the end of game play. Victory can be determined in a variety of ways. In one version of the game, victory is determined by which player dominates the most regions at the end of game play. Other victory conditions are also possible, such as timed variants, lowest score (e.g., "golf") variants, regions awarded modified by points expended, and so forth.

Continuing in block 360, the system starts game play using the received game board size, number of players, placement constraints, scoring rules, and victory conditions. The system may allow the players to play one or more games after a set of game play options have been provided. These options may provide a default basis for game play each time two particular players play the game. In some embodiments, the system stores game play options in a profile associated with each player so that each time a player plays the game the system can access that player's preferred game options. After block 360, these steps conclude.

Figure 4:
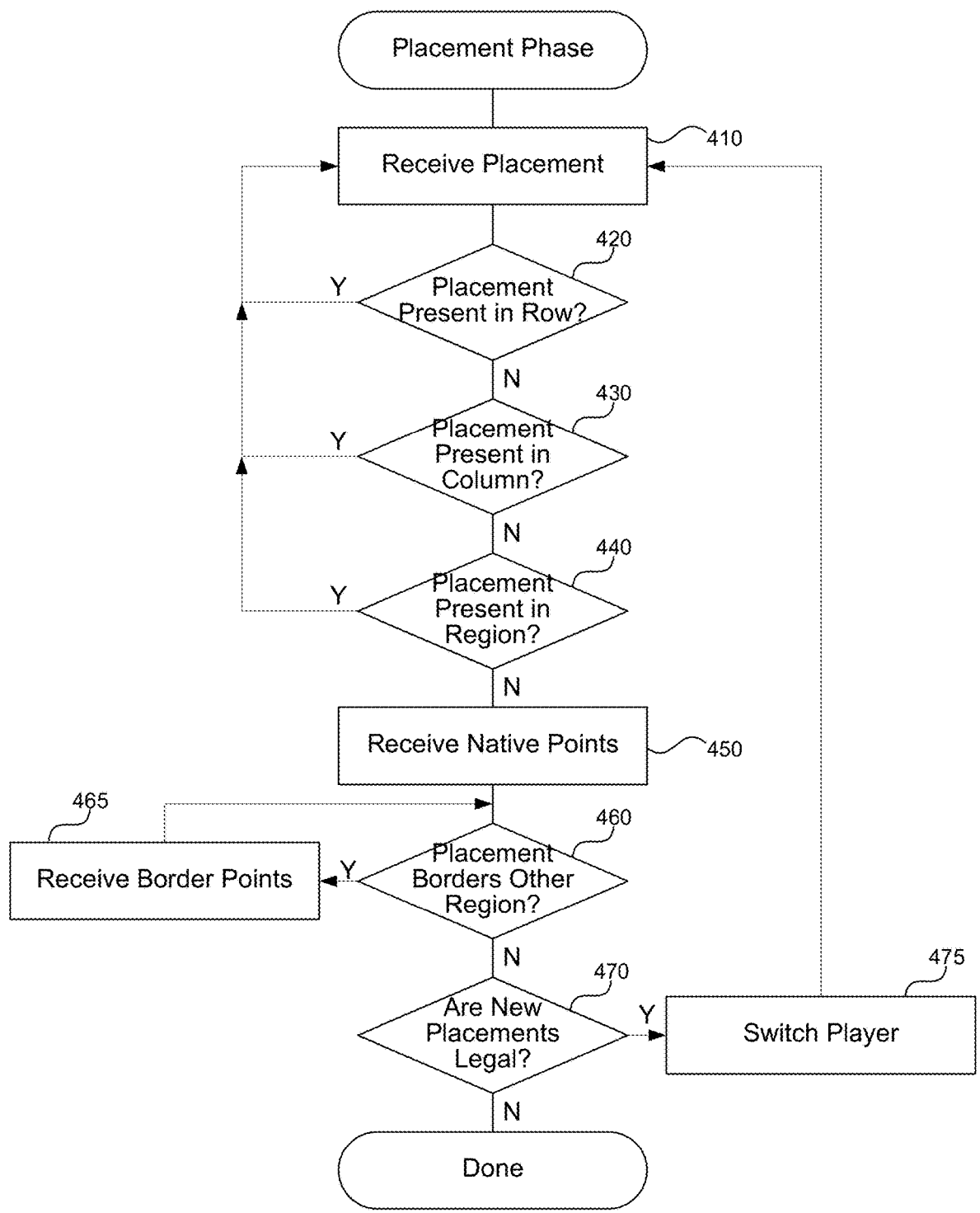
FIG. 4 is an exemplary flowchart of the placement phase of the strategy game.

FIG. 4 is an exemplary flowchart depicting player actions in the placement phase of the strategy game. The placement phase relates generally to the players involved in the game placing integers into the appropriate region cells of the game board. Beginning in block 410, the system receives a placement from the current player. Because the game board grid is based on the fundamentals of a Sudoku-style Latin square, a player is only permitted to place an integer into a grid box if the integer is not already present in the row, column, or region containing the box. This is known as "legal" placement. Continuing in decision block 420, if the placement is already present in the row, then the placement is disallowed and the system returns to block 410 to receive a different placement, else the system continues to block 430. Continuing in decision block 430, if the placement is already present in the column, then the placement is disallowed and the system returns to block 410 to receive a different placement, else the system continues to block 440. Continuing in decision block 440, if the placement is already present in the region, then the placement is disallowed and the system returns to block 410 to receive a different placement, else the system continues to block 450. In some variations, the system may penalize a player for making an illegal placement, or cause the player to forfeit his/her turn.

Continuing in block 450, upon successfully placing an integer into a box, the player is awarded points equivalent to the integer value in the region in which the integer is placed. Thus if a player places the integer eight, they receive eight points in the region in which the integer has been placed. These points are known as "native" points or "power."

Continuing in decision block 460, if the placement borders another region, then the system continues at block 465, else the system continues at block 470. During the course of the placement phase, the player may be awarded additional points if the box in which the integer was placed borders one or more additional regions. Continuing in block 465, the player receives border points or "influence". In some embodiments, if the placed integer borders one or more additional regions, the player receives points equivalent to 50% of the placed integer's value in the bordering region(s). Thus, if a player places an eight in a box that borders another region, the player receives four influence points in that bordering region.

Continuing in decision block 470, if new placements are legal, then the system continues at block 475, else the system completes and begins the resolution phase. Continuing in block 475, the system switches players and loops to block 410 to receive a new placement. Once all legal placements have been made, or the players mutually agree to end the game for some other reason, the placement phase ends and the system begins the resolution phase. After block 470, these steps conclude.

Figure 5:
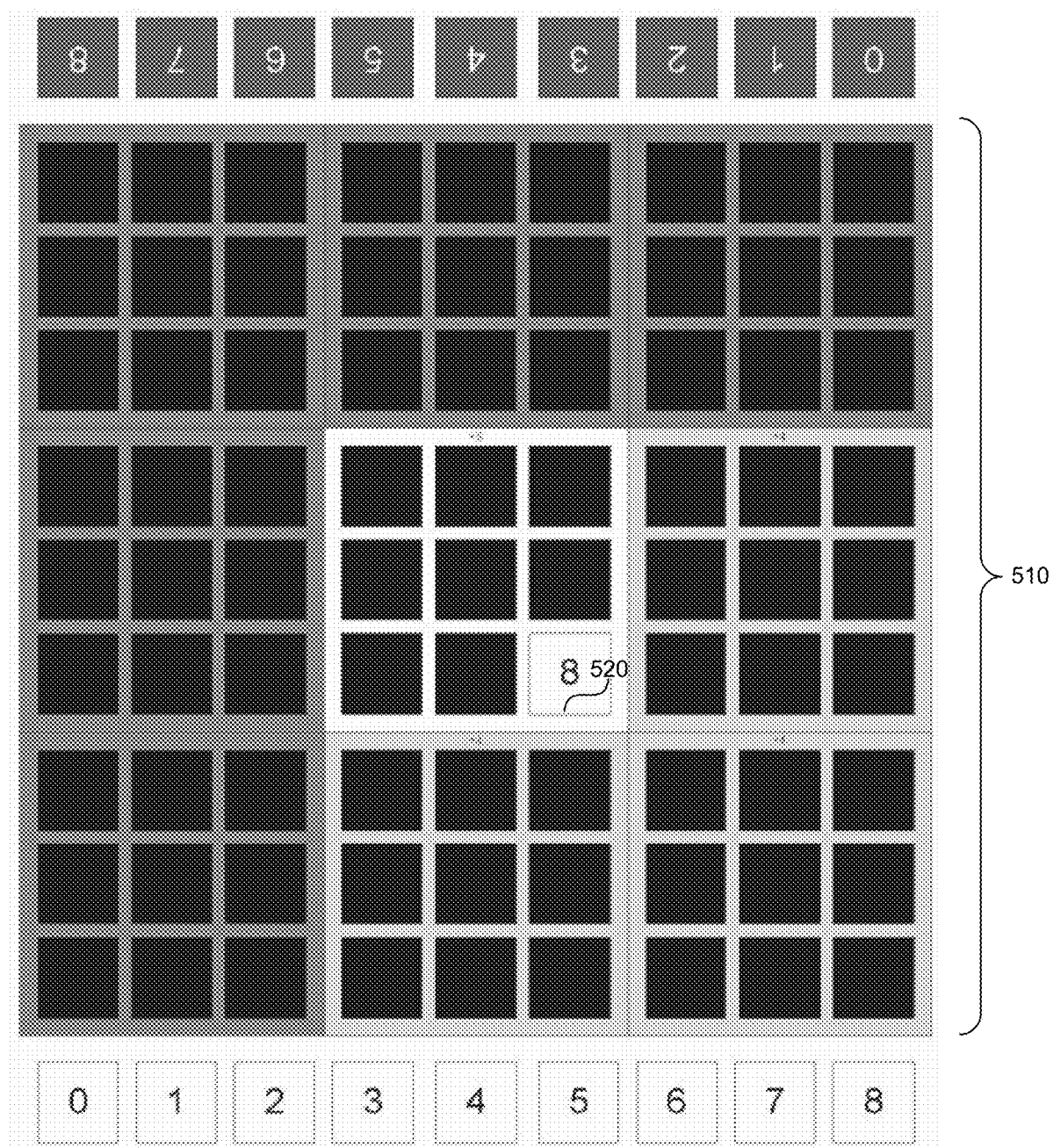
FIG. 5 is an example game board demonstrating the concepts of native points (power) and bordering points (influence).

FIG. 5 illustrates the concepts of native points and bordering points (influence) in an example game board 510. In the example, the placed integer eight 520 awards the player eight native points. Because the integer borders three additional regions, the player is awarded 50% (four points) of the integer's value in the three additional regions. Following placement of an integer, if integers may continue to be placed legally into the game board, the turn switches to the next player who may then place an integer legally. If no more integers may be legally placed, the placement phase ends and the resolution phase of the strategy game begins. Alternatively, the players may mutually agree to begin the resolution phase.

Figure 6:
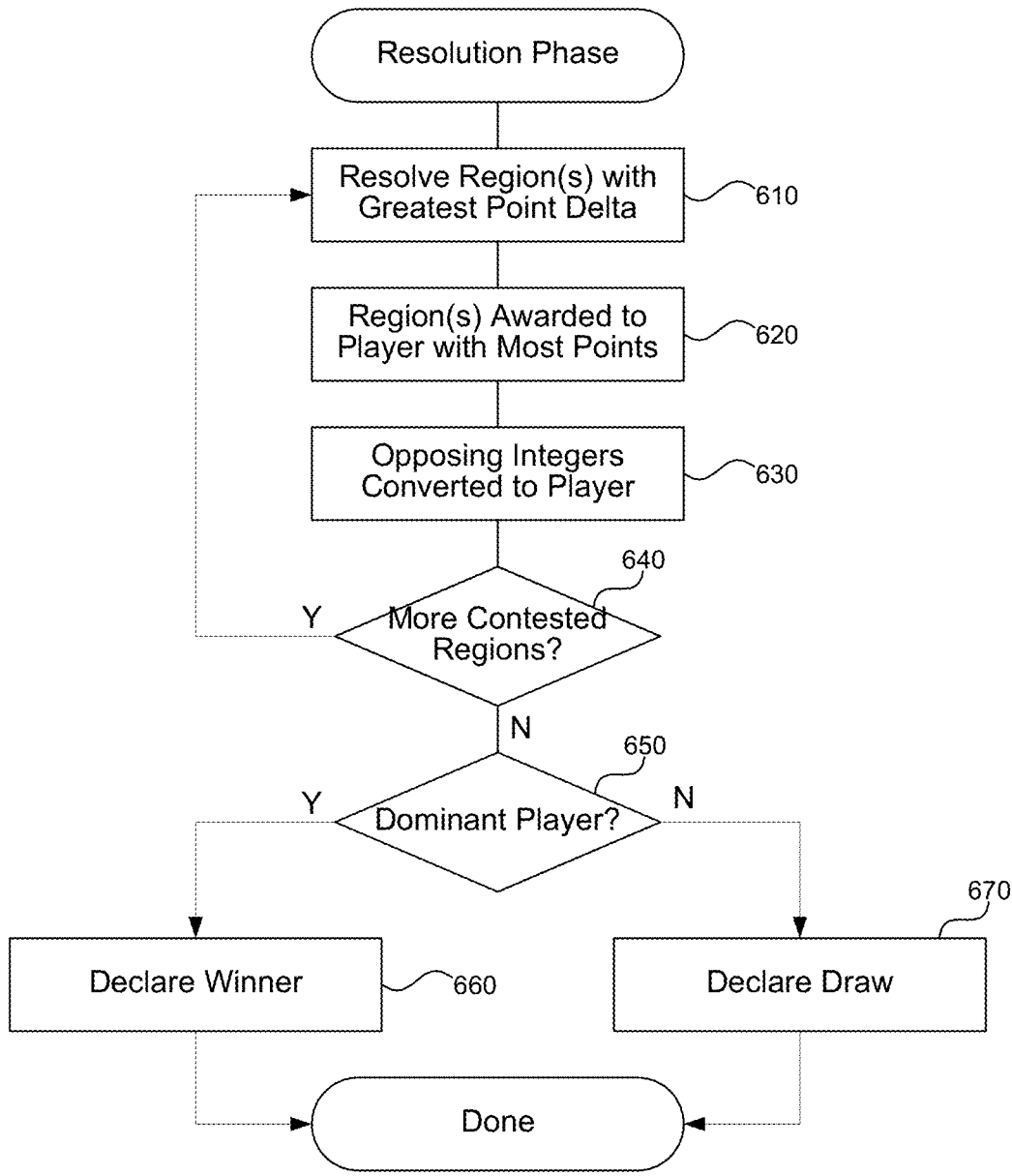
FIG. 6 is an exemplary flowchart of the standard resolution phase of the strategy game.

FIG. 6 is an exemplary flowchart demonstrating the steps of the standard resolution phase of the game. Beginning in block 610, the system resolves regions with the greatest point delta. Multiple regions may resolve simultaneously. Continuing in block 620, each region is awarded to the player with the most accumulated points in that region. Continuing in block 630, all opposing integers are converted to awarded player and point totals are adjusted accordingly.

Continuing in decision block 640, if there are more contested regions with a non-zero points delta, then the system loops to block 610 to resolve those regions, else the system continues to block 650. Continuing in decision block 650, if on player controls the most-regions, then the system continues to block 660, else the system continues to block 670. In block 660, the system declares the player controlling the most regions the winner. In block 670, the system declares a draw or tie. After block 670, these steps conclude.

Figure 7:
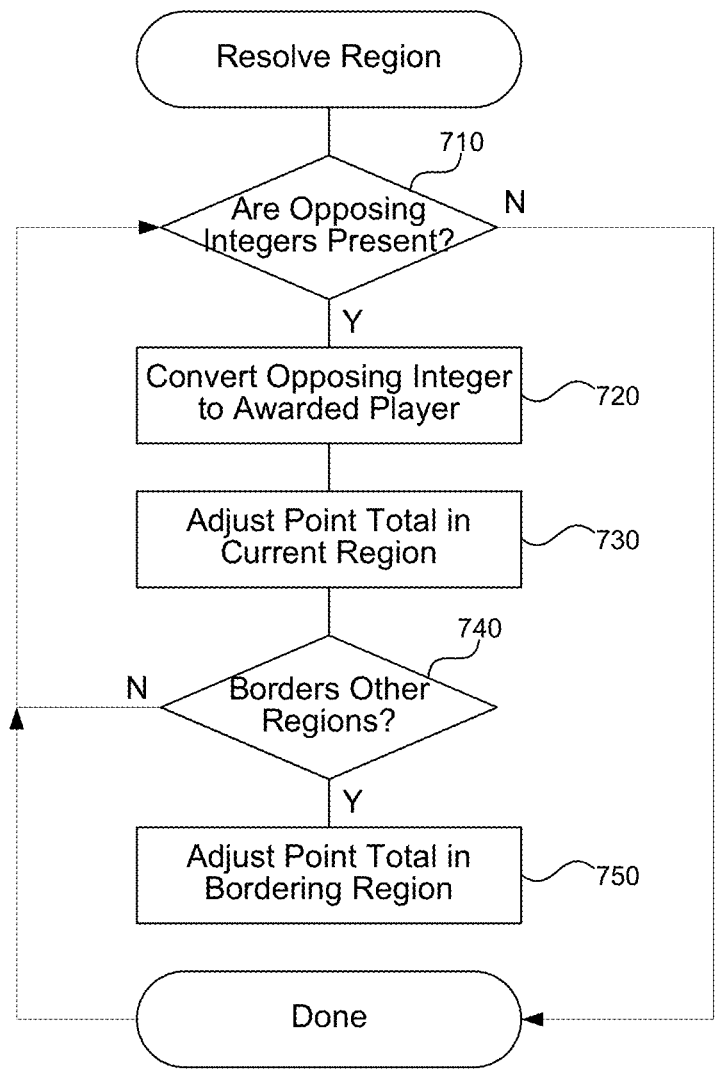
FIG. 7 is an exemplary flowchart detailing the function aspect of resolving individual regions.

FIG. 7 is an exemplary flowchart detailing the steps of the resolution of an individual region. Beginning in decision block 710, the system determines whether there are any opposing integers present in the awarded region. If there are, then the system continues to block 720, else the system completes. Continuing in block 720, the system converts an opposing integer in the current region to an awarded player. Continuing in block 730, the system adjusts the point total in the current region.

Continuing in decision block 740, the system determines whether the converted integer borders other regions. If so, then the system continues in block 750, else the system loops to block 710 to consider any other opposing integers in the current region. Continuing in decision block 750, the system adjusts the point total in the bordering regions. After each of the opposing integers have been considered, the system completes.

Figure 8:
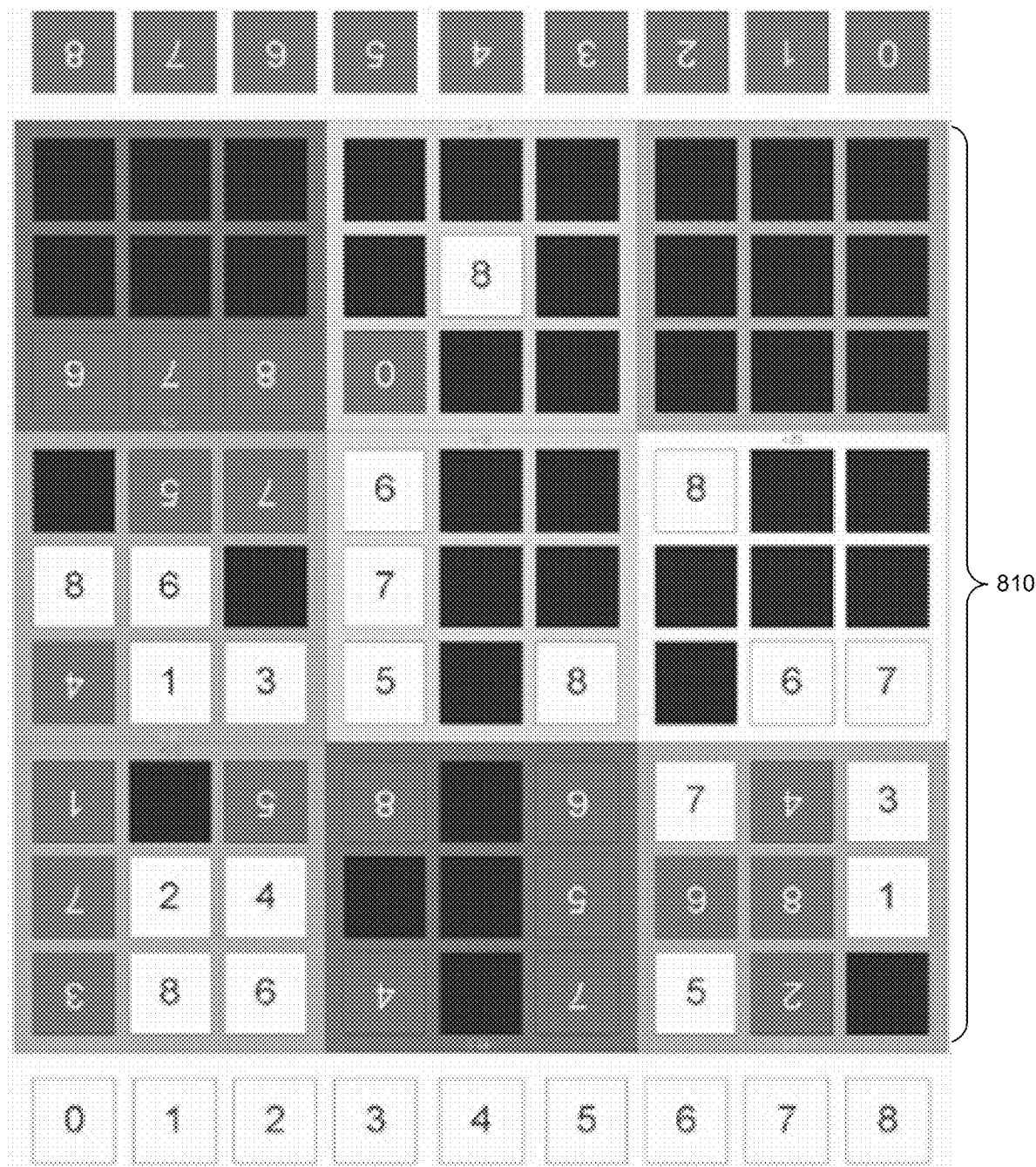
FIG. 8 is an example game board depicting the end of a placement phase.

FIG. 8 is an example game board depicting the end of a placement phase. Note that the entire game-grid 810 does not need to be filled. In this example, resolution phase is initiated by mutual agreement of both players, as continued placement of integers has been determined to no longer affect the outcome of the game.

Regions in which only a single player has native or bordering points are considered "controlled." During the placement phase, individual regions may become "contested" when multiple players have points, either native or bordering, in the same region. Once contested, the regions will be awarded to an individual player during the resolution phase. The player who has accumulated the greatest amount of total of points within the region, including both native points and bordering points, is known as the "dominant player" in that region. When a contested region is resolved, it is awarded to the dominant player.

In order to determine the order in which the contested regions of the game board are resolved, the system examines the point disparities (or deltas) present in the contested regions. Resolution of contested regions begins with the region in which the point disparity between contesting players is greatest. As previously discussed, the contested region is awarded to the dominant player.

After the contested region has been awarded, all integers in the region are converted to the dominant player and point totals adjusted accordingly. The awarded player is now the controlling player in the resolved region. Conversion of integers from one player to another is also known as "flipping." When integers are flipped, all points derived from the flipped integers are awarded to the controlling player. This includes both the native and bordering points.

In practice, the conversion of integers means taking the points from the player previously in possession of the integers, and transfers those points to the player who is awarded the integers through resolution of the region containing the integers. Thus the flipping of the integer eight on a border, where the derived bordering points are four, results in a differential shift of eight in favor of the awarded player in the bordering region(s). Specifically four points are taken from the player previously in possession of the eight, and those four points given to the player who was awarded the eight.

In FIG. 8, the greatest delta on this game board is a 25 point disparity in the middle/right region. The light player is dominant in this region which will be awarded to the light player, but as the opposing player has no integers in that region, there is no point shift in either the native or bordering regions.

The next greatest deltas are in top/left region (24 points), followed by the center region (18 points), followed by the bottom/center region (16.5 points), followed by the top/center region (7.5 points). Again, as these regions contain no opposing integers, or in the case of the top center region, the zero integer which provides no point value, there will be no point shift in either the native or bordering regions.

The next greatest delta is in the middle/left region (6.5 points in favor of the dark player). When this region is resolved, it will be awarded to the dark player and the opposing, light integers will flip, resulting in a point shift in both the native and bordering region.

However, because two of the three bordering regions which will have their point totals recalculated are already controlled (i.e. the center region and bottom/center region), the point shift in these regions will have no effect in regards to resolution.

By contrast, the point shift in the un-resolved, un-awarded, bottom left region will affect subsequent regional resolutions.

Figure 9:
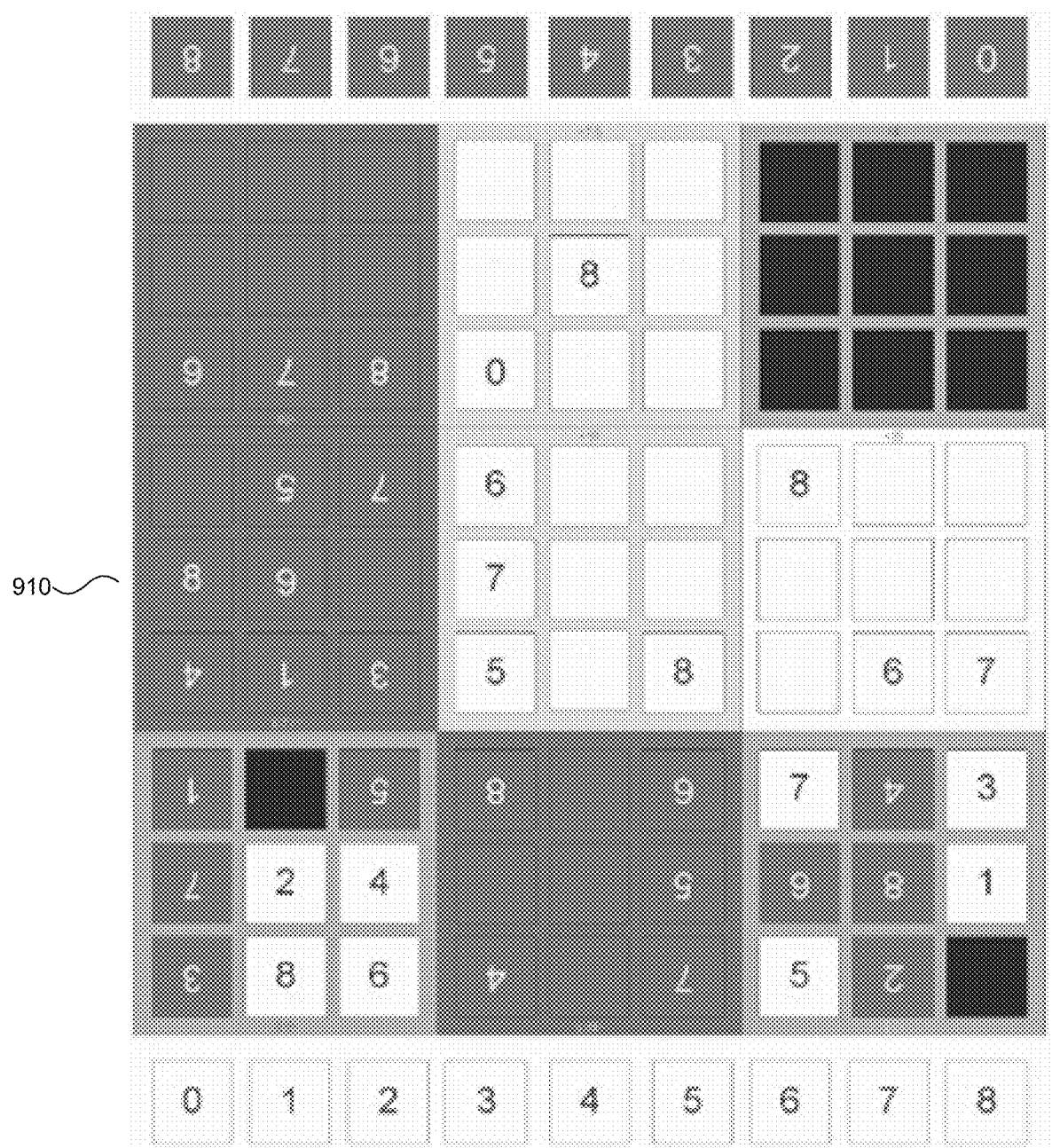
FIG. 9 is an example game board demonstrating an ongoing resolution phase where the middle/left region and top/center region have been resolved.

FIG. 9 demonstrates the differential point adjustment resulting from the conversion of integers. In FIG. 9, the middle/left region 910 has been awarded to the dominant player, now the controlling player, and all contesting integers have been converted to that player, with the corresponding points from the converted integers awarded to that player. In this figure, the adjustment of points in the center region is three in favor of the dark player who has been awarded the middle/left region, resulting in a differential shift from 18 to 15 in favor of the light player, which does not affect the light player's dominance in the center region. The adjustment of points in the bottom/left region is four in favor of the dark player, resulting in a shifting point differential from 0.5 for in favor of the light player to 3.5 in favor of the dark player, who now becomes dominant in the bottom/left region. Note that in this embodiment of a two player game, point differential in favor of the light player is displayed as positive, "+", while point differential in favor the dark player is displayed as negative, "−".

The placement of the integer zero (top/center region) is a defensive move because a player may place the integer zero into a region that is dominated by an opposing player in order to block the placement of an integer with a greater value. In this case, the integer zero does not transfer influence to an opposing player if/when the region is resolved in favor of the opposing player. This is also demonstrated in FIG. 8 and FIG. 9, where the top/center region is resolved and awarded to the light player. In this instance, the integer zero is flipped from dark to light, but grants the light player no points in the bordering regions.

In the event of multiple contested regions with equal point disparities, the regions can be resolved simultaneously. This applies whether there are multiple dominant players or a single dominant player in the tied regions. In these instances, if tied regions where different players are dominant are adjacent, resolution of any given regions will not affect the balance of power, and thus the awarding and resolution, of any other simultaneously resolved region. In the event a contested region has a zero point disparity, the region is considered "stalemated" and is not awarded to any player. This can result in tie-games.

The resolution of contested regions continues until all regions that can be resolved, are resolved. After the resolution phase has concluded, the player who controls the greatest number regions in the game board is declared the winner. If the number of awarded regions is equal among players, the game is considered tied. In alternate embodiments on game boards with an even number of regions such as 4×4 and 16×16, and in alternate embodiments with an odd number of regions and players (e.g., a three player game on a 9×9 game board), a tie game may result without stalemated regions.

Figure 10:
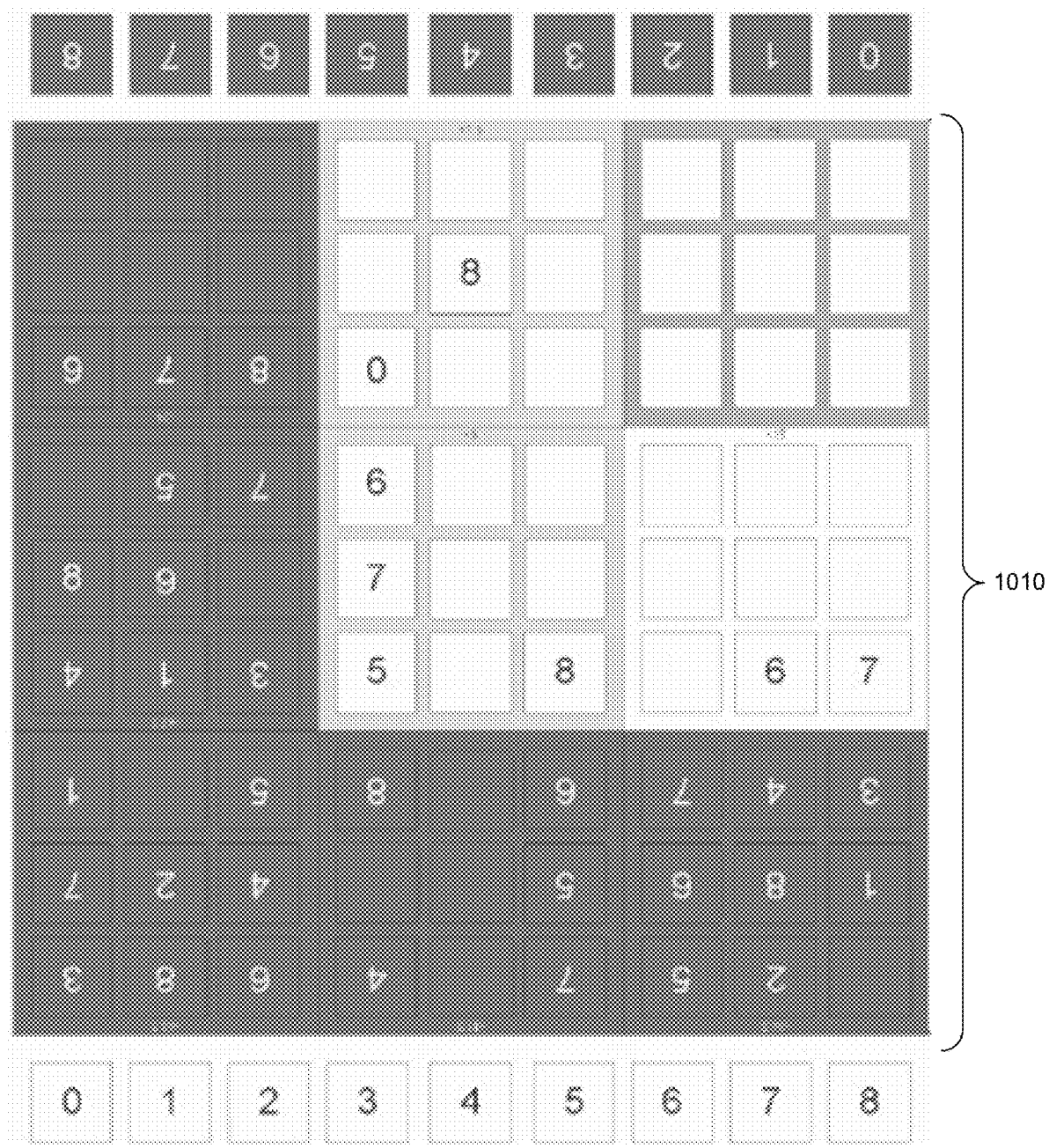
FIG. 10 is an example game board demonstrating the conclusion of the resolution phase.

FIG. 10 illustrates a game board at the conclusion of the resolution phase. The figure includes a game board 1010 with each of the regions resolved and awarded to one particular player. Each integer within each region is flipped and awarded to the player that was awarded each region.

One embodiment, or the "classic" game, is played by two players on a $3^2(3^2)$ game grid divided into $3^2$ 3×3 regions, with integers 0 through 8. The classic game grid configuration may be notated as $3^2(3^2)|2p$. The game is subject to a wide variety of rule variations that may be agreed upon and implemented by the players. A non-limiting list of gameplay rule variations is discussed below.

Tournament Play

Tournament Play refers to a contest comprised of competition across multiple, individual games. Games are played in matched sets, where players may alternate as starting player. In tournament play, victory is determined by the number of awarded regions over a series of games. In two player games on a game-grid with an odd number of regions, stalemate is difficult but can be achieved. In such a game, because the second player is disadvantaged, a regional stalemate grants the second (i.e. disadvantaged) player ½ awarded region.

In matched sets of games where players alternate first placement, where awarded regions are equal across the series of games, tie-breaking may be undertaken by awarding victory to the player with the greatest number of points on the game-grid, both power and influence, at the end of Resolution for each respective game, aggregated for all games in the series to result in a match total. Conversely, tie breaking may be based on the player who expended the fewest number of points in placement of integers across the series of games. Expended points are based on the value of placed integers, thus a player placing an 8 is said to have expended 8 points. Alternately, tie breaking may be based on total points on the game-grid at the end of resolution aggregated for all games in the match, minus total points expended in placement of integers across the series of games.

Number of Players

The game is not restricted to two player contests. Player number may be increased beyond 2. [For this reason, players are referred to as Player 1, Player 2, . . . , Player n, as opposed to Player Left and Player Right.] Theoretically, player number is infinite, restricted only by the size of the game-grid and number of available integer placements. Tournament rules can be extended for games involving >2 players.

Placement Variations

Following is a list of some rule variations that may be applied to placement of integers during play. These variations relate to both the numbers that may be placed, their quantitative values, and bonuses/penalties that may be incurred.

Loss of turn penalty may be applied for attempted illegal integer placement, where "illegal" refers to a placement which violates the orthogonal (rows or columns) or regional exclusivity constraints of the game-board. This variation may be referred to as "Master's Play" where mastery indicates skill at the pattern-recognition aspects of Sudoku (i.e. "Sudoku Master's Play").

Figure 12:
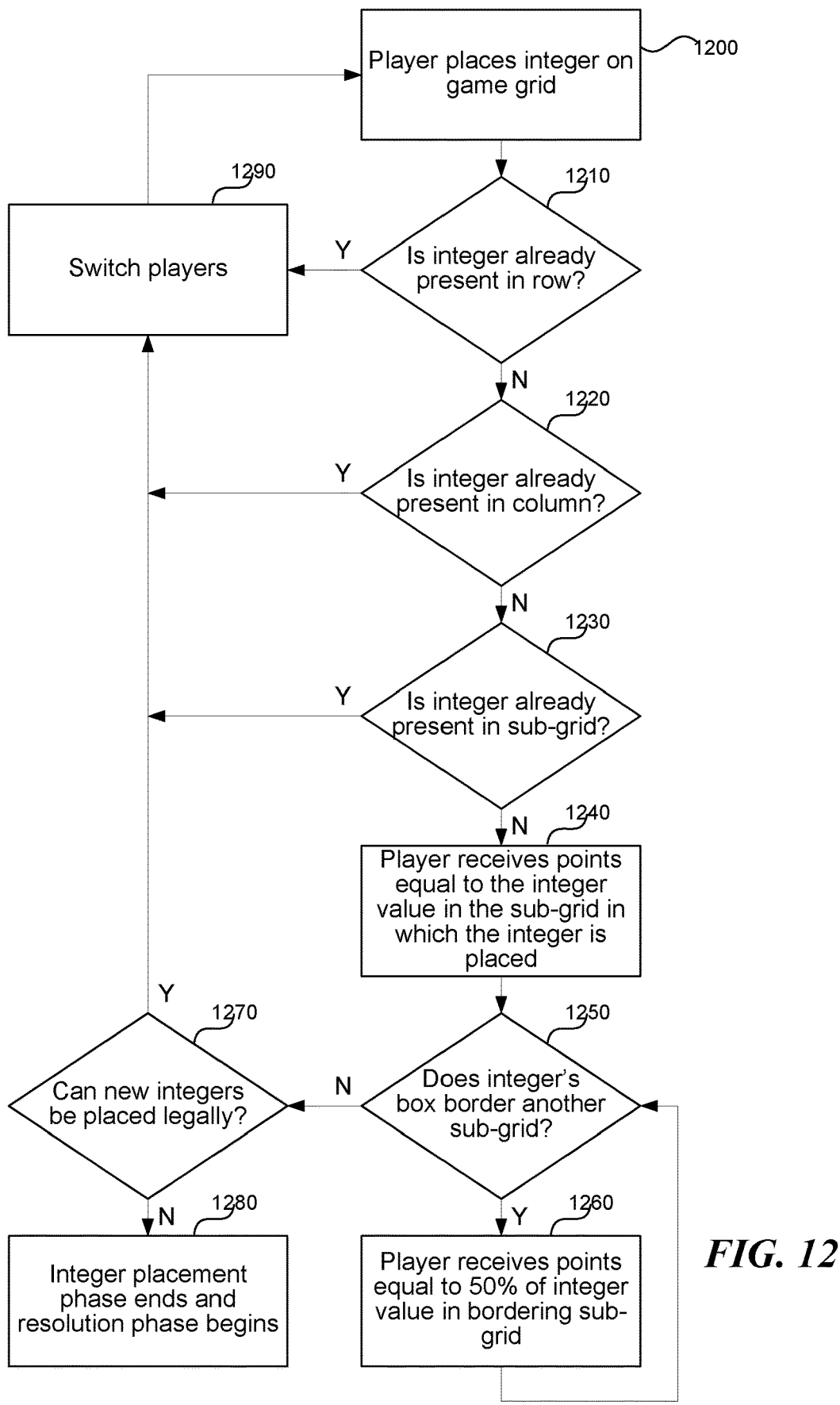
FIG. 12 is an exemplary flowchart of an alternate placement phase of the strategy game utilizing a form of the variant known as "Master's Play."

FIG. 12 is an exemplary flowchart of an alternate placement phase of the strategy game utilizing a form of the variant known as "Master's Play." Beginning in block 1200, the player places an integer on the game grid. Continuing in decision block 1210, if the integer is already present in the row, then the system continues at block 1290, else the system continues at block 1220. Continuing in decision block 1220, if the integer is already present in the column, then the system continues at block 1290, else the system continues at block 1230. Continuing in decision block 1230, if the integer is already present in the region, then the system continues at block 1290, else the system continues at block 1240. Continuing in block 1240, the player receives points equal to the integer value in the region in which the integer is placed.

Continuing in decision block 1250, if the integer's box borders another region, then the system continues at block 1260, else the system continues at block 1270. In block 1260, the player receives points equal to 50% of the integer value in the bordering region, then the system loops to block 1250 to consider other bordering regions, if any. Continuing in decision block 1270, reached after all bordering regions are considered, if new integers can still be placed legally, then the system continues at block 1290, else the system continues at block 1280. In block 1280, the integer placement phase ends and resolution phase begins. Continuing at block 1290, the game switches players and loops to block 1200 to receive a new placement. After block 1280, these steps conclude.

Expended point penalty may be added for attempted illegal integer placement, where the player is "charged" (i.e. in terms of points expended) the value of the attempted integer placement, even though that integer is not placed.

Point fractions derived from Influence may be rounded (standard floor or ceiling).

Zero may be omitted from the set of playable integers. Thus on a $3^2(3^2)$ game-grid, integers 1 through 9 may be used in place of 0 through 8.

Alternate sequences of numbers may be used, for instance sequences that to not increment by 1. Additionally, sets of non-sequential integers may be used.

The cardinality (number of integers) of the set of playable integers may not correspond to game-grid dimensions or number of boxes in regions. Thus a 6×6 game grid of 9 2×2 regions, or "$3^2(2^2)$", may be played with integers 0 through 8. [This allows for denser placement, compared to the same board configuration with integers 1 through 4, which will result in "sparser" board.]

Negative integers may be used. [Use of negative integers is interesting because a player can place them in a region where they are not dominant, raising the position of that region in the resolution order, and then deriving Influence from the flipped negative integer when the region is resolved. Negative integers may be referred to as "partizan," not to be confused with the use of partisan to describe a class of combinatorial game. In games of more than two players, additional methods must be employed in order to use negative integers. One method is to assign the negative integer to the player placing it, and then granting the points derived from the flipping of that integer to the assigned player. Likewise, the initial positive points derived from the un-flipped negative integer may be assigned to the dominant player in the region at the time of placement, where the region is contested by multiple players. Another more general method is to simply subtract the value of the flipped negative integer from the Influence of the controlling player in relevant adjoining regions, rather than granting Influence points derived from the flipped integer to any opposing player, including the player who originally placed the negative integer.]

Negative integer(s) may be used without sequential constraint. (Thus on a $3^2(3^2)$ game-grid, integers −8,1,2,3,4,5, 6,7,8, or −7,−3,1,2,3,4,5,6,7 may be employed.)

A variable negative integer may be used. For instance, the available negative integer may begin at eight, and when placed, decrement to negative seven, and so forth, until zero.

A variable negative integer may be used based on greatest available positive integer. (Thus, where eight is the greatest available positive integer, eight may be played. If all 8's have been placed, −7 may be placed so long as a 7 may still be placed.)

A variable negative integer may be used based on number of un-played regions on the game-grid, reducing to zero. Un-played regions may be defined as regions that contain no integers, or regions that contain no points (i.e. Power or Influence.)

A variable negative integer may be used based on turn number, reducing incrementally to zero from the negative value of the top positive integer. (For instance, the variable negative integer may reduce by one for each set of $n^2$ integer placements.)

Any rational number may be used in place of integers for placement. For instance, on a $3^2(3^2)$ game-grid, numbers 1.9, 2.8, 3.7, . . . , 9.1 may be employed.

Additional placement bonuses may be granted based on achievement of pre-defined conditions. Bonuses may take the form of points, Advantage, additional turns, etc.

A point bonus may apply for integer placement in the box in the center of a region. (This may be applied in n-by-n regions where n is an even number >2 by granting the bonus for placement in any of the four center boxes.)

Bonus may be granted for achieving geometric patterns of sympathetic integers, both intra- and inter-regionally. (Sympathetic integers refer to integers belonging to the same player.) For instance, bonuses may be applied for sympathetic integers occupying symmetrical positions in a region, such as all four corners, or for sympathetic integers in four connected inter-regional corners. [Because placement requires pattern recognition, pattern bonuses lend themselves naturally to the method.]

Bonus may be granted for linking sympathetic integers, both inter- and intra-regionally. Linking refers to integers in connected boxes. Connection may be understood as orthogonal and/or diagonal adjacency. This may be applied to any linked integers or only to linked integers that meet certain pattern conditions such as forming a sequence. Sequence bonuses are desirable not only because players love them, as demonstrated by the popularity of Scrabble and Poker, but also because a player may choose to place a lower integer to achieve a greater gain, or play a lower integer in order to block an opponent's greater gain.

Disadvantaged players may be a granted compensatory placement. For instance, in a $3^2(3^2)$|2p with integers 1 through 8, Player 2 may place two integers up to a sum of 14 points on their first turn, to balance the inherent 4-point advantage of Player 1 in initially contesting the center region.

Integers may have "qualities" that make them distinct from integers with the same value but different qualities. For instance, if qualities are represented by colors, on a 4×4 region, the available integers for placement could be red 1 through 8 and blue 1 through 8.

Another variant provides a balancing mechanism whereby "resource points" must be accrued before placing higher value integers. Integers/icons receive a Resource Bonus ("Resource Points" or "RP") inversely proportional to the value of the integer/icon in relation to the highest possible integer/icon value. Thus, in a game utilizing integers 0 through 8, a placed eight receives zero RP, but a placed one receives seven RP. (2=6 RP; 3=5 RP; 4=4 RP; 5=3 RP; 6=2 RP; 7=1 RP). Placement of a zero in the above scenario may grant eight RP, no RP, or some predetermined level of RP, such as 50% (4 RP).

Resource Points are awarded in the native region, and may be applied to bordering regions in the same manner as Influence (i.e., 50% of RP to regions bordering the integer/icon). Resource Points may be used in tie-breaking or point aggregation in a tournament scenario, but the main use is facilitate a modified placement variation, where players can only place integers/icons if they have enough resource points in the region to "support" that integer/icon. "Support" means that the placing player has RP equal to or greater than an integer/icon they wish to place. Thus, a player may not initially place an 8, which has 0 RP, but must first place lower value integers until eight or more RP have accumulated in the territory in which they wish to place an integer/icon.

Additionally, integers/icons that grant RP also consume RP. Thus, while a one will grant seven RP, one RP is consumed by the placed integer/icon itself, which has a value of one. (A placed two grants six RP, but two RP are consumed by the integer/icon, yielding four additional RP.) From a metaphoric standpoint, integers/icons grant Power and Influence based on their structural strength. Thus an eight, which may be represented as a Castle, grants the maximum Power and Influence, but delivers so Resource Bonus. (The idea is that a Castle is the strongest structure, but few natural or human resources are derived from its location, whereas a Village is a weak structure, but yields a great deal of natural and human resources in the form of food production and population.)

Conversely, a one, which may be represented by a Village, grants minimal Power and Influence, but yields the maximum Resource Points to support higher value structures like Castles. The amount of RP granted by an integer/icon may be modified. Additionally, RP granted may vary over a set number of turns on a cycle, the analogy being seasons. Thus in a 8 turn cycle, the amount of RP conferred may wax and wane, reaching their greatest value for the two turns representing Summer, and their least value for the two turns representing Winter.

If a structure (integer/icon) has been placed but no longer has sufficient RP to support it, a penalty is applied. Penalties may take the form of diminished Power and Influence, with the reduction based on the RP shortage needed to fully support that structure. Other penalties may be applied, such as the removal of a structure if no RP are available to support it. Removal may occur immediately, or after a set number of turns without support. Penalties may be modified.

Negative integers/icons may grant RP in accordance with their Power and Influence (i.e., the RP derived from a negative integer/icon go to the player who benefits from that negative integer/icon's Power and Influence). Alternate rules may be applied for RP derived from negative integers/icons, such as ½ RP are awarded, or no RP are awarded.

An additional bonus representing wealth may be applied in the form of Currency Points ("CP"). Currency Points are derived from having integers/icons connected to other sympathetic integers/icons ("Sympathetic" refers to integers/icons belonging to the same player.) The metaphor is that these connections form roads that result in commerce and the generation of wealth.

Certain integers/icons, for instance a Town, may receive an inherent CP bonus, based on the idea that these structures produce wealth in the form or goods. CP may be converted into either RP or Power/Influence, and may be applied to any integers/icons belonging to that player. Application of RP may be modified each placement turn.

Influence Variations

Numerous variations regarding influence may be applied. Influence may be exerted at variable distances. This can be applied to all integers, individual integers, or sets of integers. Influence distance may be determined by conditions such as integer magnitude, or box/border proximity (box distance from regional borders). Influence value may vary, based on a number of conditions including integer value, inclusion in a pre-defined set. This may be applied in conjunction with, irrespective of, or based on Influence distance variation.

Influence may be applied to individual integers, based on connection to opposing integers, and integers may be flipped or displaced (4.1) during Placement Phase if the Influence value exceeds a defined quantity. (For instance, if the value of opposing Influence exerted on an integer exceeds the value of the Influenced integer and supporting Influence of connected sympathetic integers. Alternately, this may be based on a ratio such as 2× the value of the Influenced integer and supporting Influence of connected sympathetic integers.)

Under certain conditions, Influence may be blocked. Particular integers may have the effect of neutralizing Influence exerted by adjacent, extra-regional, opposing integers. Regions may exert Influence. For instance, ½ the value of aggregate Power may be applied to all adjacent regions. Regional Influence may be conditional. For instance, only uncontested regions will apply Influence. Influence distance and value variations may be applied to regional Influence.

Regional Influence may be extended across intervening regions to non-adjacent regions by linking sympathetic integers across intervening regions. The linked, sympathetic integers are considered to form a "supply line." Game-grid edges may be considered to connected, where opposite edges of the game grid are said to adjacent. This may be referred to an "edge connection." In effect, this is a "wrap-around" scheme where Influence is exerted by integers placed at the game grid edges on regions located on the opposite side of the game-grid.

Influence points derived from edge connection may be modified, with different modifiers for different axes. The directions in which Influence is applied may be modified. For instance, Influence may be applied only orthogonally. By extension, Influence may be applied only diagonally.

Integer Displacement Variations

Displacement refers to the act of removing or causing a placed integer to be removed from the game-grid based on certain conditions. Following are some basic uses. Integer displacement may be effected based upon pre-defined conditions. Integers rendering boxes illegal for any integer placement may be displaced without loss of turn. Such displacement may be limited to a single displacement per turn, multiple displacements per turn, or unlimited. This is referred to as "Wildcard Displacement."

Placed integers may be moved, so long as the resulting position is legal, and the moved integer belongs to the moving player. Technically, such movement is actually a function of displacing the integer from its previous position and re-placing it in a new position. This is referred to a "Sympathetic Displacement." Displacement bonuses may be earned based on achievement of certain pre-defined conditions. These bonuses may take the form of a sympathetic displacement ("move" of previously placed integer belonging to the moving player) without loss of turn, or the displacement of an opposing integer without loss of turn.

All integers in a given row and/or column, or a given region, or all integers with equivalent value may be removed from the game board based on certain conditions. For instance, once, per game, once per player per game. Conversely, the second player in a two-player game may exercise this option, which then allows the starting player to exercise this option. This may be allowed once per game, an unlimited number of times, or another, specified number of times. In games with more than two players, this may start with the player last in the placement order, and move up the order to the starting player before resetting back to the last player.

Integer Placement Constraints

Additional integer placement constraints may be added, and existing constraints may be modified or removed. Integer placement quantity constraints may be utilized. For instance, only $n^2-1$ of any given integer may be placed on the game-grid. (Thus where $n^2=9$, only 8 of a given integer may be placed.) Integers may not be placed in boxes where placement would result in an un-complete-able game-grid. An un-complete-able game-grid is a configuration where not all boxes can be filled in legally.

Unplayable boxes may be designated prior to play. For instance, a corner box in the center region may be unplayable. Alternately, an unplayable box may occupy each of n positions across n regions, conforming to orthogonal and regional constraints. Unplayable boxes may also be employed regardless of orthogonal constraints and with random quantitative distribution across some/all regions. [This is particularly useful in games with an even number of regions with an even number of cells in each region such as $4^2(4^2)|2p$ because it breaks the symmetry and disallows a stalemate based on the second player mirroring the first player's placements.]

Placed integers may be required to be connected to previously placed sympathetic integers, with the exception of first placement. Integers may only be placed in regions adjacent to regions that contain a sympathetic integer, with the exception of first placement. Initial integer placement may be restricted to the edges of the game-grid, or an edge region, particularly in conjunction with the two variations described herein.

Placed integers are the lowest (least value) in the playable integer set. When all players have placed in a given turn, all integers on the game board are incremented. This process continues until any given integer reaches the max value in the integer set, on conditions that the integer resulting from the incrementing is legal. If an integer may not be legally incremented, it remains at its current value.

Integers allowed for placement are based on ascending/descending scale that repeats. (For instance, on the first turn players must place a one, on the second turn a two, etc., until the max value is reached and the cycle repeats.)

First integers placed must be the lowest positive integer in the set, with subsequent placement of incrementally higher value integers based on the value of previously placed, connected integers, either individually or in aggregate. Alternately, max value of subsequent placed integers may be based on a player's aggregate points in a region, with the exception of first integer placement. Any lesser integer may be placed adjacent to previously placed greater integers. Negative integer placement may be excluded from these conditions, or require corresponding positive value.

Additional placement may be granted for players lower in the placement sequence. For instance, Player 2 gets two placements on their first turn. All subsequent players in the sequence may receive the same bonus, or this may increment with turn, where Player 3 gets three placements on their first turn. After the first round of placement by all players, placement proceeds normally with a single placement per turn. Bonus additional placement may be granted to the disadvantaged player(s) at some pre-determined point. (For instance, in a 2-player game, Player 2 may be granted an additional placement on turn $n^3/3$.) Initial placement of the starting player maybe restricted to a single integer, where subsequent placements for all players may be dual or greater.

Orthogonal exclusivity constraints may be restricted relative to the position of the placed integer. (For instance, orthogonal exclusivity constraints extend ½ $n^2$–1 boxes in all directions from the placed integer where $n^2$ is odd. Where $n^2$ is even, distance may be ½ $n^2$–1 in one direction, and ½ $n^2$-in the opposite direction. In this latter case an additional rule may be applied to designate the orientation the greater sides, for instance, the greater side is always away from the game-grid center, or always toward the game grid center. Alternately, where $n^2$ is even, orthogonal exclusivity may extend ½ $n^2$ in all directions.)

Diagonal exclusivity constraints may be employed. Regional exclusivity constraints may be removed. Orthogonal exclusivity constraints may be removed. Placement bonus and penalty variations may be applied to individual players as a method of handicapping. Integer placement may cost the placing player "placement points" equal to the value of the placed integer. In a game that results in a tie, the player with the least amount of charged placement points (lowest total value of integers played) wins. Correspondingly, this method may be applied to tie breaking in tournament play.

Integer Transformation

Transformation refers to altering the value of a placed integer or integers, and may involve multiple integers. It may also take the form of integer displacement.

Placed sympathetic integers that are linked may be merged to form an aggregate value so long as the new value/position is legal. This may be allowed in an unlimited fashion, or limited to a certain number of merges (for instance, 1 per turn). Additionally, ability to merge may be granted based on achievement of pre-defined conditions.

These merged values may be restricted to the play values, or comprise new values that are legal as long as they conform to orthogonal and regional exclusivity constraints.

Placed integers may be split into multiple, linked, sympathetic integers so long as all resulting integer value/positions are legal. (Value of split integers must be equal or less than the original integer.)

Transformation of opposing integers may be employed, where a player can subtract some or all of the value of an integer belonging to them, and correspondingly reduce the value of linked, opposing integers, so long as all resulting integer value/positions are legal. If the value of the active player's integer exceeds the value of the opposing integer, the opposing integer may be reduced to the lowest playable integer that is positionally legal, or displaced and removed from the game-grid. Alternately, if the value of the opposing, linked integer is greater than the active player's integer, the active player's integer may be reduced to the lowest playable integer that is positionally legal, or displaced and removed from the game-grid.

Under certain conditions, all integers in a region may be incremented/decremented so long as the resulting value/positions are legal. Where illegal, the integers may be displaced or skip to the next legal integer. These functions may be referred to as "increasing a region" and "reducing a region."

Resolution Variations

Numerous variations regarding the resolution of the game-grid may be employed.

Resolution of a region may be forced once outcome cannot be altered, prior to ending of Placement Phase. (Specifically, when Power or Influence derived from additional integer placements is not sufficient to change the Dominant Player.) Alternately, forced resolution may be contingent upon all legally playable integers being placed in the region an along all external borders. [This variant may be of more interest on larger game-grids where the resolution of a single region will not immediately determine outcome of the overall game.]

In games where forced resolution is employed, entire regions may be re-flipped based on certain conditions (for instance where opposing Influence is greater than total Power and supporting Influence). This may be employed in conjunction with integer displacement, particularly where individual integers in a forcibly resolved region are displaced.

Resolution does not begin until game-grid is completely filled-in or complete-able. Placement and displacement continue until the game-grid is complete (or complete-able and by agreement of all players) at which point Resolution Phase begins. Wildcard Displacement will facilitate the outcome of a complete or complete-able game-grid.

Under the basic rules, regions with equal deltas are resolved simultaneously, and regions with a zero delta are considered stalemated. However, ties, of either equal deltas in multiple regions, or zero deltas, or both, may be broken by rule of Advantage. Advantage is typically based on placement order, and can be defined as AdvantageOrderPosition=NumberOfPlayers−PlacementOrderPosition+1. [Alpha=Pn−Phi+1] Thus, Advantage order is the reverse of placement order, where last player to place has the initial Advantage, and the first player to place will always be last in the advantage order. Once employed, Advantage switches to the next player in the sequence.

A tiebreaker rule may be employed based on aggregate number of points derived from placed integers over the course of a series of games. [This tiebreaker rule will increase the length of the individual games because the players will be compelled to place all possible integers before beginning Resolution Phase.]

Regional resolution order may be altered based on pre-defined conditions. For instance, resolution order may be reversed and occur in order of lowest Delta, or be based on player choice utilizing rules of Advantage. [Player choice works better on larger game-grids, as the advantage of first choice may always be too great on game-grids with a smaller number of regions, such as nine.]

Figure 11:
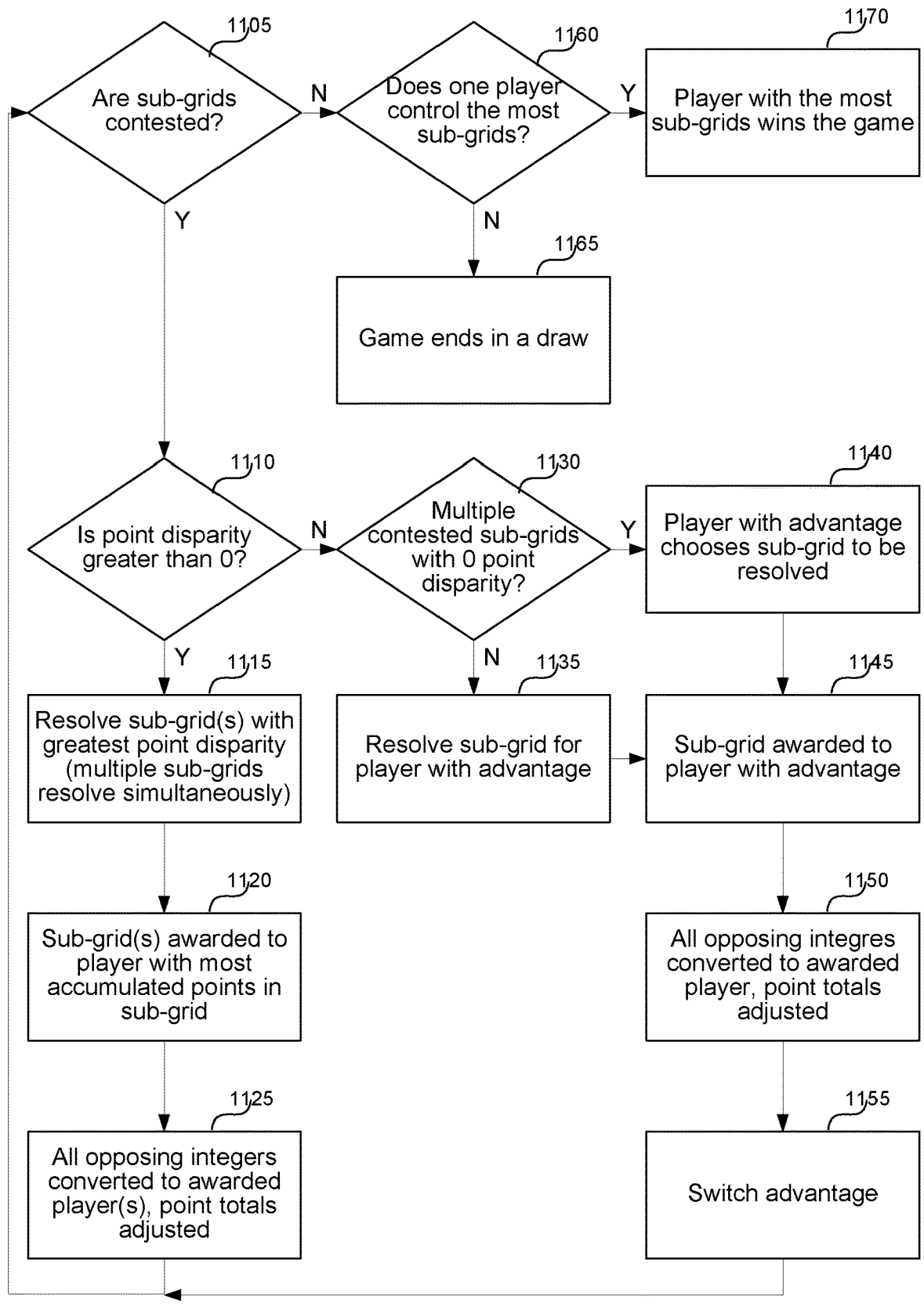
FIG. 11 is an exemplary flowchart of an alternate resolution phase of the strategy game utilizing the rule of "advantage."

FIG. 11 illustrates an alternate resolution phase of the strategy game utilizing the rule of "advantage" specifically in relation to stalemated regions. Beginning in decision block 1105, the system determines whether any regions are contested. If so, then the system continues in block 1110, else the system continues in block 1160. Continuing in decision block 1110, the system determines whether there is a point disparity greater than zero. If so, then the system continues in block 1115, else the system continues in block 1130. Continuing in block 1115, the system resolves the region(s) with the greatest point disparity. Potentially multiple regions will resolve simultaneously. Continuing in block 1125, the system converts all opposing integers to the player awarded the region, and adjusts point totals accordingly. The system then loops to block 1105 to consider additional contested regions.

Continuing in decision block 1130, reached when the system determines that the point disparity in a contested region is not greater than zero, the system determines whether there are multiple contested regions with a zero point disparity. If there are not, then the system continues at block 1135, else the system continues at block 1140. Continuing in block 1135, the system resolves the region for the player with advantage. Alternatively in block 1140, the system allows the player with advantage to choose which region will be resolved. Continuing in block 1145, the system awards the region to the player with advantage. Continuing in block 1150, the system converts all opposing integers to the awarded player and adjusts point totals accordingly. Continuing in block 1155, the system switches advantage. The system then loops to block 1105 to consider additional contested regions.

Continuing in decision block 1160, if one player controls the most regions, then the system continues at block 1170, else the system continues at block 1165. In block 1165, the game ends in a draw. In block 1170, the player with the most regions wins the game. After block 1170, these steps conclude.

Regional resolution order may be based on the ratio of the delta, with higher delta ratios resolved first. Ratio of the delta may also be to break resolution order ties between multiple regions with equal deltas.

Power and Influence derived from the awarding of a resolved region may be granted over subsequent resolution turns rather than of all at once, based on pre-defined conditions. For instance, no Influence may be granted on the resolution turn in which the integers are flipped, but instead granted after the subsequent regional resolution. On the resolution turn, the player losing the integers still loses their Power and Influence. Re-assignment of points may be fractional, such as 25% per resolution turn.

Resolution of a region may be based on conversion of individual integers over subsequent resolution turns, instead of immediate conversion of all opposing integers in a region. Integers to be converted may be based on defined conditions (highest/lowest) or with players choosing which to convert. [For instance, this may begin with the lowest integer in the region with the highest delta. On the next resolution step, the new lowest integer in the first region flips. Concurrently, the lowest integer in the region with the second highest delta flips. On the next resolution step, the new lowest integer in the 1st region flips, the new lowest integer in the 2nd region flips, and concurrently, the lowest integer in the region with the third highest delta flips. This continues until integers in all contested regions are flipping, and ends when all integers in contested regions are flipped. Alternately, integers flipped may be the highest in a contested region, the highest in a contested region subject to special requirements, or selected randomly.] Multiple integers may be flipped based on a value, such as the value of the delta at the start of that resolution turn.

All regions may be resolved simultaneously. (Thus flipping of integers during resolution has no effect.)

Stepped resolution refers to a variation by which resolution takes place in steps, as opposed to resolving an entire region at once. This may begin with the lowest integer in the region with the highest delta. On the next resolution step, the new lowest integer in the first region flips. Concurrently, the lowest integer in the region with the second highest delta flips. On the next resolution step, the new lowest integer in the first region flips, the new lowest integer in the second region flips, and concurrently, the lowest integer in the region with the third highest delta flips. This continues until integers in all contested regions are flipping, and ends when all integers in contested regions are flipped. Alternately, integers flipped may be the highest in a contested region, the highest in a contested region subject to special requirements, or selected randomly.

Game-Grid Variations

Game-grid variations are a simple way to provide interesting new challenges.

The size and configuration of the game-grid may be modified. In two player games, configurations with odd number of regions, such as the classic $3^2(3^2)$, are preferred, as the asymmetry yields a true center. In a sense, what make a game are balanced asymmetries. In two player games with even number of regions, the second player can mirror the first player to achieve stalemate, although the second player may be incentivized to break the symmetry if they perceive a sub-optimal placement by the opponent. Games with an even number of regions and an odd number of players, such as 42*42/42|3p, reintroduce the asymmetry.

Regional subdivision may be varied beyond the "super-symmetrical" configuration as in classic Sudoku where the game-grid regional X/Y of 3×3 is mirrored by the regional box x/y of 3×3. Regional subdivision may be "semi-symmetrical," defined as a game-grid where regional box x/y dimensions are uniform and symmetrical, but distinct from game-grid regional X/Y dimensions. (For instance, game-grids comprised of 3×3 2×2 regions, 5×5 3×3 regions, etc.) Regional subdivision may be "somewhat-symmetrical," defined as a game-grid where regional box x/y dimensions are uniform but not symmetrical, and may be different from game-grid regional X/Y dimensions. (For instance, a 12×12 game-grid comprised of 2×3 3×2 regions.) Regional subdivision may be "sort-of-symmetrical," defined as a game-grid where regions have the same number of boxes but are not necessarily dimensionally uniform. (A form of this variant may be seen in the "nonomino" configuration of the Sudoku puzzle.) Regional subdivision may be asymmetrical, defined as a game-grid where regions may be comprised of any number of boxes in any number of shapes. The overall game-grid may not be a square.

Multiple, connected game-grids may be linked to form a super-grid, where orthogonal exclusivity constraints are restricted to the discrete game-grids. Alternately, exclusivity constraints may be relative to integer position or regional position. For instance in a game-grid of 5×5 region with 3×3 boxes in each region, orthogonal exclusivity constraints may only apply one region in each direction from the native region.

Additional game-grid layers may be applied. An additional filled-in, static grid may be applied to the game-grid. Values of the added grid are said to be underlying, comprising a map, where the static integer values modify the value of placed integers. [In this variation, the basic game-grid can be understood as the "structure" layer, where the underlying, static, map may be understood as the "terrain" layer. Multiple terrain layers may be applied, such as a topological layer and organic layer. Thus, hills may be forested, rocky, grassy, etc.] Additional, underlying, filled-in, or partially filled-in static grids may be applied. [Additional underlying, static, maps may be understood as sub-terranean "resource" layers.] Additional plastic layers may be overlaid on the structural and map layers where integers may be generated/placed and moved. Mobility of "Units" (where Units refers to the moveable integers in the plastic layers) may vary based on unit values and assigned qualities, and be modified by terrain and structure layer values.

Additional filled-in or partially filled in fluid map layers may be overlaid which modify integer values/qualities/mobility on underlying layers. The overlaid fluid layers may fluctuate by turn based on fluid layer value interactions. An additional modifier may be applied to this layer where integer value modifiers fluctuate on an increasing and diminishing cycle over a set number of turns. [This fluid map layer may be understood as the atmospheric layer, as in weather.] Additional plastic layers may be overlaid applied where units move at constant rates in a single direction. [These may be understood as "orbital layers."] An additional grid layer may overlay where Units are immobile. [This may be understood as the "geosynchronous orbital layer."] Any given layer may have distinct integer modifier relationship with any other layer. Inter-layer modifiers may take any form, for instance integer total point bonus/penalty, or modification of the qualities of mobile Units on plastic layers. Exclusivity constraints for may be applied individually to layers. In layers without exclusivity constraints (for instance, terrain and resource layers), values may alter over subsequent turns (analogous to deforestation or exhaustion of resources).

Three-Dimensional game-grids may be employed. Regional exclusivity constraints may be applied to cubic regions.

Hexagonal game-grids may be employed. Diagonal exclusivity constraints may be applied in conjunction with this variation, where an integer may exist only once in any given orthogonal column, or diagonal row/column.

Time Variations

Variations regarding time in relation to gameplay may be applied. Time restrictions may be placed on player moves, either by a set limit for individual moves, or total time for player/moves in a game. The game may be played in "real-time" mode by removing the player turn constraint from integer placement.

Visual Variations

These are not rule variations, but rather variations on the way in which the game board is represented. Geometric representations of quantity and magnitude may be substituted for integers. [This is rather geeky but adds an additional element of pattern recognition in ornamental fashion.]

Icons may be substituted for integers. [This variation puts game play into a modern "strategy game" context. For instance, structures may be used to signify integers—a Walled Town representing an eight, a Castle a 7, a Tower a 6, a Mill a 5, a Manor a 4, a Village a 3, a Farm a 2, a Field a one, a Forest a 0. Any manner of themes may be employed in this spirit.]

Chance Variations

Deterministic play games of perfect information are rare and of great interest. Chance is in some sense redundant because M can easily scale in complexity to yield factors beyond calculation, which produces a similar effect. Nevertheless, imperfect information and chance variations may be employed, as these variations will likely be of interest to many players. Methods are myriad, and only a few are described here by way of example.

Imperfect information may be employed. Imperfect information may be utilized in the form of unseen opposing integers in a number of circumstances. These may be Units in a region where a player has no integers or no integers on the border of the region in question. Terrain boxes may be hidden from players based on certain conditions such as having adjacent integers or integers in the region. Values of underlying resource layers may not be known until "surveyed." The game-grid regional configuration may be hidden. As integers are placed, the game-grid configuration becomes visible.

Random elements may be employed. [Randomness, however, would seem to be redundant as the complexity of the game can easily be scaled to the point where outcomes may seem random, as in factors beyond calculation.] "Hidden" modifiers, both negative and positive, may be assigned to individual boxes at random when an integer is placed. Outcomes between mobile Units may include a random modifier, as in strategy board games that use dice. Playable integer in any given placement round may be assigned at random, where all players must play the chosen integer for that round.

Alternate Victory Conditions

Alternate victory conditions may be used to make the game simpler or more complex. Regions may not be resolved. The victor is the player dominant in the greatest number of regions. The victor is the player with the greatest number of points on the board. Regions are resolved but the victor is the player with the greatest number of points on the board at the end of resolution.

In sets of games, the victor is the player with the greatest number of points at the end of resolution over the series of games. Points awarded may be based on the difference between points at the end of the game and total value of placed integers. (This may be applied to Power and/or Influence.)

Victory may be decided based on net gain. In this variant, the game is decided by "points gained," not regions, where points gained=total points at end of game minus points expended in placement of integers. Points expended refers to the value of the integers, where placing an eight costs eight points, placing a seven costs seven points, etc.

Victory may be based on "strength of control". This refers to the condition of point totals being adjusted in regions that have already been resolved. Although these point total adjustments will not affect the awarding of a previously resolved region (i.e. it has already been awarded), nevertheless a delta will be present in that resolved region, because that region may border resolved regions belonging to another player. Thus victory can be based not just on the number of awarded regions, but the strength of control relating to the magnitude of the deltas for each region after resolution has concluded.

Cyclic Gameplay Variations

A version of the game where there is no defined beginning and ending may be defined. Generally, this would take place on larger order game-grid with a combination of Placement Constraint variations, Integer Displacement and Transformation variations, and Resolution variations, in particular, Forced Resolution. A cyclic game could even be played on a previously played-on game-grid, with integers and controlled regions existing prior to beginning of a new play cycle. In a cyclic game, victory is determined by the number of regions awarded over the duration of play. Gameplay duration may be pre-determined. Alternately, gameplay duration may continue until all players agree to end the game.

Variations

The [M] method has the unique quality that variations may be employed without changing the fundamental nature of the game.

The core game, or "Classic" version (i.e. exemplary embodiment) is based on a very simple set of rules falling into three categories: game board rules which define how integers may be placed based on the rules of the special case of the subdivided Latin square, commonly referred to as the Sudoku-square; scoring rules, which are defined as Power and Influence; resolution rules which determine the outcome. All variations are merely extensions of this core game. Thus, a game played on a game-grid configuration other than the "Classic" $3^2(3^2)$ is still the same game, as is a game played with more than two players. Most of the other variations provide nuance, but in general do not change underlying mechanics that comprise the [M] method.

Rule variations have advantages. For instance, the "Classic" version may prove to be ultimately solvable. Yet the application of even a single variation results in an unsolved version. Because of the nature of combinatorics, unsolvable versions may be easily produced, yet these versions are nevertheless easy to play from the standpoint of game mechanics.

From the foregoing, it will be appreciated that specific embodiments of the system have been described herein for purposes of illustration, but that various modifications may be made without deviating from the spirit and scope of the invention. Accordingly, the invention is not limited except as by the appended claims.

I claim:

1. A computer-implemented method to manage game play of a multiplayer Sudoku game, the method comprising:
   receiving one or more game variation option values that determine how the multiplayer Soduku game will be played;
   displaying a game board on a computing device associated with each player, wherein the game board includes a grid with a plurality of regions arranged according to common rules of Sudoku;
   while one or more placements can still be made in accordance with common rules of Sudoku,
      alternating which player's turn it is and allowing a player whose turn it is to make a placement on the game board;
      receiving the placement from the player whose turn it is, which includes receiving an integer value and a location on the game board with which to associate the integer value;
      updating scoring for each of one or more regions affected by the received placement;
   after all of the one or more placements are received, determining a final score and a dominant player for each of the plurality of regions of the game board; and
   declaring a winner of the multiplayer Soduku game based on which player dominates more of the plurality of regions,
   wherein the preceding steps are performed by at least one processor.

2. The method of claim 1 wherein receiving game variation options comprises receiving at least one of a size of the game board, a number of players, one or more placement constraints, and one or more victory conditions.

3. The method of claim 1 wherein displaying the game board comprises transmitting game information over a network to the computing device associated with each player.

4. The method of claim 1 wherein displaying the game board comprises transmitting game information to a computing device associated with one or more non-player spectators.

5. The method of claim 1 wherein displaying the game board comprises using three dimensional graphics hardware of the computing device.

6. The method of claim 1 wherein displaying the game board comprises displaying one or more un-played numbers associated with each player.

7. The method of claim 1 wherein alternating which player's turn it is comprises a round robin order between players in a multiplayer Sudoku game with two or more players.

8. The method of claim 1 wherein receiving the placement comprises determining whether the placement is a legal move according to common rules of Sudoku and any variation options received, and if the placement is not legal, then displaying an error and allowing the player to try another placement.

9. The method of claim 1 wherein updating scoring comprises determining native points, including one or more integer values added to a particular region, and influence points, including a weighted factor of the one or more integer values applied to regions other than the one in which the one or more integer values were placed.

10. The method of claim 1 wherein determining the final score and the dominant player comprises determining an order in which each region will be resolved and determining a final score and dominant player for the regions in the determined order.

11. The method of claim 1 wherein determining the final score and the dominant player comprises resolving each region, wherein resolving a region results in flipping ownership of the values of placements in that and other regions from one player to another player so that the scoring changes.

12. The method of claim 1 wherein determining the final score and the dominant player comprises selecting as the dominant player the player that has the highest score in each region.

13. The method of claim 1 wherein declaring the winner comprises declaring the player with the most regions the winner.

14. A computer system for playing a multiplayer Sudoku-based game, the system comprising:
   a processor and memory configured to execute software instructions embodied within the following components;
   a game variation component that provides one or more options for game variations to two or more players and receives one or more values for each option;
   a game board component that provides a game board that builds a Latin square adhering to common rules of Sudoku and that includes multiple regions within a larger grid;
   a turn component that determines which of the two or more players is allowed to make a placement at any given point in time during the multiplayer Sudoku-based game;
   a placement component that receives placements of values selected by the two or more players upon the game board;
   a scoring component that tracks score information for each player and for each region;
   a resolution order component that determines an order in which each region will be resolved to determine a final score and a dominant player for each region after a placement phase of the game has completed;
   a region resolution component that resolves each region in the order specified by the resolution order component to determine the final score and the dominant player for each region; and a victory component that determines which among the two or more players to declare a winner of the game based upon the determined dominant player for each region after the region resolution component completes resolving each region.

15. The system of claim 14 wherein the turn component allows the players to mutually agree to end the game early while legal placements are still available, and wherein the game advances to resolution of regions upon the players mutually agreeing to end the game early.

16. The system of claim 14 wherein the scoring component applies the common rules of Sudoku and received game variation values by assigning value to one or more integer symbols placed on the larger grid, wherein value is applied based on an integer's native region and additionally if that integer borders another region.

17. The system of claim 14 wherein the resolution order component communicates with the scoring component to determine a current delta value for each region based on continuous scoring calculation provided by the scoring component, wherein the current delta value for each region indicates whether each region is contested, and which player is leading in each region.

18. The system of claim 14 wherein resolving includes adding up native points and influence points in a particular region as well as any bonus points, and determining which of the players to which to award each region.

19. A non-transitory computer-readable storage medium comprising instructions for controlling a computer system to receive game play variation options for a multiplayer Sudoku-based game, wherein the instructions, upon execution, cause a processor to perform actions comprising:
   receiving a game board size for a game board that includes a grid with multiple regions in which player pieces can be placed;
   receiving a number of players that is at least two, wherein two or more players play the multiplayer Soduku-based game by alternating placing pieces on the game board;
   receiving one or more placement constraints that define how players can place pieces within the regions of the game board;
   receiving one or more scoring rules for generating a score for each player for each region;
   receiving one or more victory conditions that determine how a winner is declared among two or more players at an end of game play; and
   starting game play using the received game board size, number of players, placement constraints, scoring rules, and victory conditions.

20. The medium of claim 19 wherein receiving the game board size further comprises receiving other qualities including values that define additional dimensions of the game board.

* * * * *